United States Patent
Sparey et al.

(10) Patent No.: US 8,004,220 B2
(45) Date of Patent: Aug. 23, 2011

(54) MOTOR DRIVE VOLTAGE-BOOST CONTROL

(75) Inventors: Malcolm Eric Sparey, Birmingham (GB); Adrian Szabo, Solihull (GB); Graham William White, Birmingham (GB); Jeffrey Ronald Coles, Solihull (GB); Connel Brett Williams, Leamington Spa (GB); Yangsheng Chen, Sollihull (GB)

(73) Assignee: TRW Limited (GB)

( * ) Notice: Subject to any disclaimer, the term of this patent is extended or adjusted under 35 U.S.C. 154(b) by 291 days.

(21) Appl. No.: 11/632,111

(22) PCT Filed: Jul. 8, 2005

(86) PCT No.: PCT/GB2005/002699
§ 371 (c)(1),
(2), (4) Date: Mar. 31, 2008

(87) PCT Pub. No.: WO2006/005927
PCT Pub. Date: Jan. 19, 2006

(65) Prior Publication Data
US 2008/0265808 A1    Oct. 30, 2008

(30) Foreign Application Priority Data
Jul. 10, 2004  (GB) .................................. 0415511.5

(51) Int. Cl.
*H02P 6/08* (2006.01)
(52) U.S. Cl. ................. 318/400.22; 318/400.14
(58) Field of Classification Search ............ 318/700, 318/400.01, 400.14, 400.22, 400.24, 400.26, 318/400.3, 400.41, 720–724, 479, 504
See application file for complete search history.

(56) References Cited

U.S. PATENT DOCUMENTS

| | | | | |
|---|---|---|---|---|
| 3,781,641 A | * | 12/1973 | Rettig | 363/36 |
| 3,863,120 A | * | 1/1975 | Rettig | 318/701 |
| 3,949,283 A | * | 4/1976 | Okuyama et al. | 318/400.14 |
| 4,039,914 A | * | 8/1977 | Steigerwald et al. | 318/375 |
| 4,066,938 A | * | 1/1978 | Turnbull | 318/803 |
| 4,088,932 A | * | 5/1978 | Okuyama et al. | 318/400.02 |
| 4,240,015 A | | 12/1980 | White | |
| 4,384,243 A | * | 5/1983 | Muskovac | 318/729 |
| 4,520,298 A | | 5/1985 | Abbondanti | |
| 4,682,094 A | * | 7/1987 | Kuroiwa | 318/723 |
| 4,684,858 A | * | 8/1987 | Ma et al. | 388/820 |
| 4,779,031 A | | 10/1988 | Arends et al. | |
| 4,788,485 A | * | 11/1988 | Kawagishi et al. | 318/811 |
| 4,870,332 A | | 9/1989 | Goghran et al. | |
| 5,209,075 A | * | 5/1993 | Kim | 62/126 |

(Continued)

FOREIGN PATENT DOCUMENTS
EP    1 092 981 A3    4/2001
(Continued)

*Primary Examiner* — Bentsu Ro
(74) *Attorney, Agent, or Firm* — MacMillan, Sobanski & Todd, LLC

(57) ABSTRACT

A drive system for a motor having a rotor and a phase winding (a, b, c) comprises; a drive circuit including switch means associated with the winding a, b, c for varying the current passing through the winding; rotor position sensing means arranged to sense the position of the rotor; control means arranged to provide drive signals to control the switch means; a power input for connection to a power supply at a nominal voltage; and boost means in electric communication with the power input and power output, and controllable to boost the nominal voltage to a higher voltage for application to the winding.

27 Claims, 24 Drawing Sheets

U.S. PATENT DOCUMENTS

| | | | |
|---|---|---|---|
| 5,325,042 A * | 6/1994 | Murugan | 322/10 |
| 5,373,195 A * | 12/1994 | De Doncker et al. | 307/45 |
| 5,373,223 A * | 12/1994 | Akagi et al. | 318/722 |
| 5,631,529 A * | 5/1997 | Shimizu et al. | 318/432 |
| 5,675,231 A * | 10/1997 | Becerra et al. | 318/801 |
| 5,708,343 A * | 1/1998 | Hara et al. | 318/599 |
| 5,892,643 A * | 4/1999 | Esser et al. | 361/18 |
| 5,898,288 A * | 4/1999 | Rice et al. | 318/685 |
| 6,075,331 A * | 6/2000 | Ando et al. | 318/376 |
| 6,580,275 B2 * | 6/2003 | Hui et al. | 324/414 |
| 6,759,822 B2 * | 7/2004 | Marusarz | 318/268 |
| 2004/0033456 A1 | 2/2004 | Shah | |
| 2004/0095089 A1 | 5/2004 | Collier-Hallman | |

FOREIGN PATENT DOCUMENTS

| | | |
|---|---|---|
| GB | 992014 | 5/1965 |
| JP | 5-30602 | 2/1993 |
| JP | 9-149686 | 6/1997 |
| JP | 9-149689 | 6/1997 |
| JP | 11-89270 | 3/1999 |
| JP | 11-127589 | 5/1999 |
| JP | 2001-314095 | 11/2001 |
| JP | 2002-171783 | 6/2002 |
| JP | 2004-254476 A | 9/2004 |

* cited by examiner

MOTOR DRIVE VOLTAGE-BOOST CONTROL

CROSS-REFERENCE TO RELATED APPLICATIONS

This application is a national stage of International Application No. PCT/GB2005/002699 filed Jul. 8, 2005, the disclosures of which are incorporated herein by reference, and which claimed priority to Great Britain Patent Application No. 0415511.5 filed Jul. 10, 2004, the disclosures of which are incorporated herein by reference.

BACKGROUND OF THE INVENTION

The present invention relates to multiphase motor control systems. It is particularly suitable for permanent magnet AC motors, but is also applicable to other types of electric motor such as DC brushless motors, switched reluctance motors and induction motors.

Electric motors are becoming increasingly common in a diverse range of applications. It is known, for example, to provide an electric power steering (EPS) system of the kind comprising an input shaft, an output shaft, a torque sensor adapted to measure the torque in the input shaft, and an electric motor adapted to apply an assistance torque to the output shaft dependent upon the torque measured by the torque sensor.

A typical permanent magnet electric motor comprises a rotor that is magnetic, for example including a permanent magnet, and a stator including a plurality of phase windings on a yoke. Applying suitable voltages across each of the phase windings causes current to flow through the windings, generating a current flux vector in the air gap between the stator and the rotor. This flux interacts with the magnetic field of the rotor to cause the rotor to rotate to a point of equilibrium in which the current vector is aligned with the axis of the rotor magnetic field.

To cause the rotor to turn continuously, the current passed through the windings must be varied in a sequence. This causes the current vector to rotate. This can be achieved by modulating the voltages across each winding under the control of a motor drive circuit.

The torque developed in the motor is dependent firstly on the current passing through the windings, in a generally linear manner, and secondly on the phase of the current relative to the flux due to the rotor magnets. When the rotor is stationary, the greatest torque is developed when the current vector is in quadrature with the rotor flux vector; no torque will be developed when the current is in phase with the rotor flux. For this reason, motors are generally controlled so as to keep the current in quadrature with the rotor flux. However, as rotor speed increases the back emf that is produced limits the torque that can be produced, and it is known to advance the phase of the current with respect to the rotor flux, which can increase the torque available under certain circumstances.

Furthermore, the maximum rotational speed of such a motor is dependent upon the voltage at the motor phase terminals—this voltage must be greater than the back EMF generated by the motor in order to generate a torque. For a battery-powered motor such as would be used in an EPS system, the maximum motor speed is therefore indirectly governed by the battery voltage. However, it is known to boost the voltage from the battery using a voltage boost circuit. Such circuits enable the voltage to be temporarily boosted so that the effective voltage as applied to the motor phase terminals is higher than the basic battery voltage.

BRIEF SUMMARY OF THE INVENTION

According to the invention, there is provided a drive system for a motor having a rotor and a phase winding, the system comprising a drive circuit including switch means associated with the winding for varying the current passing through the winding; rotor position sensing means arranged to sense the position of the rotor; control means arranged to provide drive signals to control the switch means; a power input for connection to a power supply at a nominal voltage; and boost means in electric communication with the power input and power output, and controllable to boost the nominal voltage to a higher voltage for application to the winding; in which the control means is arranged to vary the phase of the current passing through the winding relative to the rotor position and to control the second voltage output by the boost means.

The present invention further provides a drive system for a motor having a rotor and a phase winding, the system comprising: a drive circuit including switch means associated with the winding for varying the current passing through the winding; control means arranged to provide drive signals to control the switch means; a power input for connection to a power supply at a nominal voltage; in which the control means is arranged to control at least one control parameter of the motor thereby to limit the magnitude of the current from the power supply to a maximum.

The present invention further provides a drive system for a motor having a rotor and a phase winding, the system comprising an input arranged to receive a battery current from a battery; switch means associated with the winding for varying the current passing through the winding; a dc link arranged to provide an input current to the switch means; a current sensor arranged to measure the current in the dc link; a low pass filter arranged to average the output from the current sensor, and control means arranged to determine the battery current from said output.

The present invention further provides a push-pull voltage boost circuit comprising a bifilar wound component having two windings on a common magnetic core, each having one end connected to a common first potential, two active switches arranged to be switched on alternately to connect a respective one of the windings to a second potential thereby to produce a boosted voltage across the pair of windings, and two further switches arranged to be switched on alternately to connect a respective one of the windings to an output thereby to apply the boosted voltage to the output.

Other advantages of this invention will become apparent to those skilled in the art from the following detailed description of the preferred embodiments, when read in light of the accompanying drawings.

DETAILED DESCRIPTION OF THE INVENTION

Figure 1:
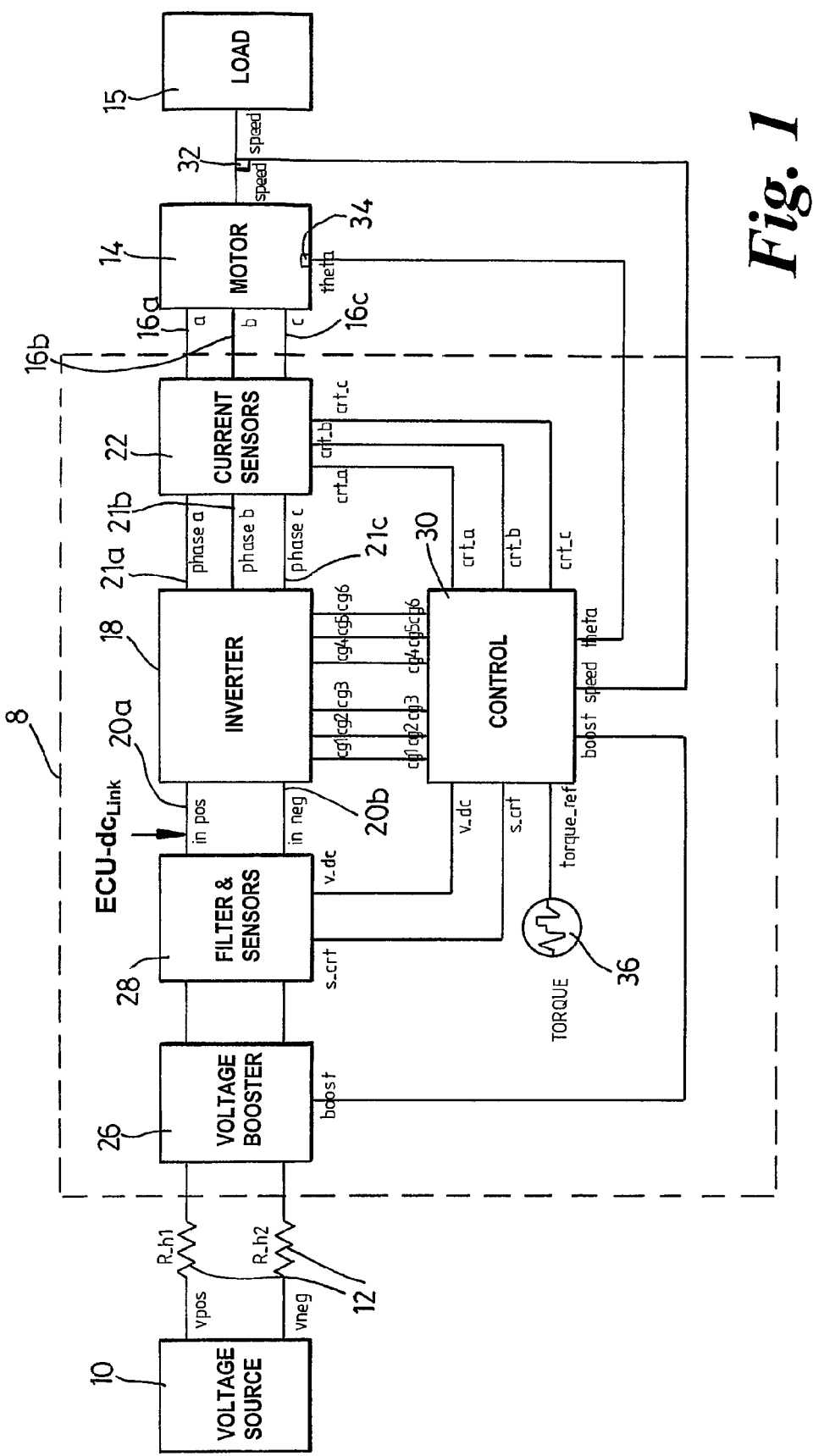
FIG. 1 is a schematic diagram of a drive system according to the invention.

Referring to FIG. 1 a drive system according to an embodiment of the present invention comprises a drive circuit 8, which is arranged to take power from a DC power supply 10, in this case a vehicle battery, via a wiring harness 12 represented as resistors Rh1 and Rh2. The drive circuit 8 uses this power to drive a three-phase AC motor 14 which is connected to a mechanical load 15, in this case the output shaft of an EPS system. The motor 14 is conventional and comprises three motor windings generally designated as phases a, b and c, connected in a star network. One end of each winding is connected to a respective terminal 16a, 16b, 16c. The other ends of the windings are connected together to form a star centre.

The drive circuit 8 comprises an inverter 18. The inverter 18 comprises three pairs of switches, typically transistors. Each of the pairs of switches comprises a top transistor and a bottom transistor connected in series between a positive line 20a and negative line 20b from the voltage source 10. Three outputs 21a, 21b, 21c are each tapped off from between a respective pair of transistors. The outputs 21a, 21b, 21c are each connected to the respective motor terminal 16a, 16b, 16c via current sensors 22.

A voltage boost circuit 26 is provided between the battery 10 and the inverter 18. A filter and sensor block 28 between the voltage boost circuit 26 and the inverter 18 is arranged to filter the input to the inverter 18 and to sense the dc-link voltage and current input to the inverter 18.

A controller 30 is arranged to control the switches in the inverter 18 so as to provide pulse width modulation of the current to the motor windings a, b, c. The controller 30 therefore has six switch control outputs producing switch control signals cg1, cg2, cg3, cg4, cg5, cg6 to the control gates of the six switches. It also has a boost control output providing a control signal to the voltage boost circuit 26 so that it can control the level of boost applied to the voltage from the battery 10 before it is input to the inverter 18. The controller 30 receives input signals from the dc-link sensors 28 indicating the instantaneous dc-link voltage ECU-$dc_{link}$ and current, from the current sensors 22 from which it can determine the three motor phase currents, from a speed sensor 32 on the motor output from which it can determine the motor speed, from a motor position sensor 34 from which it can determine the rotational position of the rotor of the motor 14. The controller also receives a torque demand input and is arranged to control the inverter 18 to drive the motor to produce the demanded torque.

The switches in the inverter 18 are turned on and off in a controlled manner by control circuit 30 to provide pulse width modulation of the potential applied to each of the terminals 16a, 16b, 16c, thereby to control the potential difference applied across each of the windings a, b, c and hence also the current flowing through the windings. This current is sensed by the current sensors 22. Control of the phase currents in turn controls the strength and orientation of the total current vector produced by the windings, and hence also the phase of the rotating current vector, relative to the phase of the magnetic field of the rotor as that rotates.

In a practical system it is usual to have the current sensors 22 to measure the current in each of the phases, or a single current sensor 28 in the dc link which can be used to measure the current in each of the phases by sampling the current at controlled times in the PWM period of the controller 30.

Figure 2:
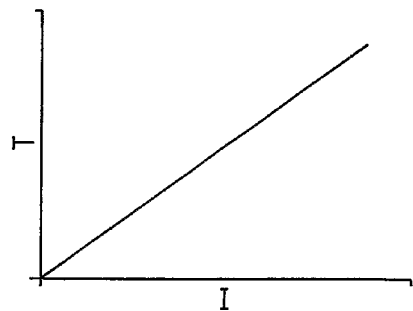
FIG. 2 is a graph showing the torque characteristic of the motor of the system of FIG. 1.
Figure 3:
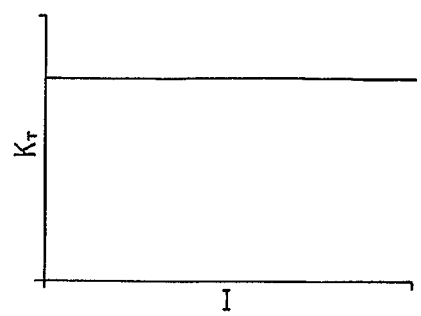
FIG. 3 is a graph showing the torque constant of the motor of the system of FIG. 1.
Figure 4A:
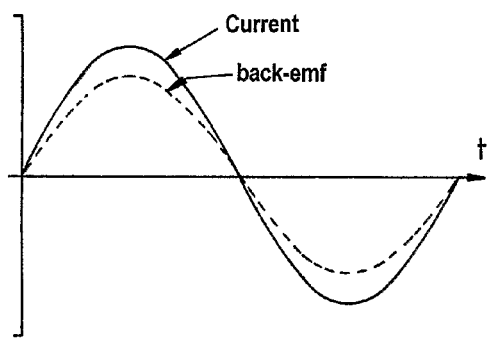
FIGS. 4a and 4b are graphs showing the current and the back emf in the motor of FIG. 1 with zero and non-zero phase advance angles.

Referring to FIG. 2 and FIG. 4a, in the simple case where the phase of the current waveform is in phase with variation in time t of the rotor position and hence also in phase with the back emf produced in the motor, the torque T is directly proportional to the phase current I, and given by the equation:

$$T = K_T I$$

where $K_T$ is the motor torque constant. Under normal circumstances, $K_T$ is constant over all currents as shown in FIG. 3.

Figure 4B:
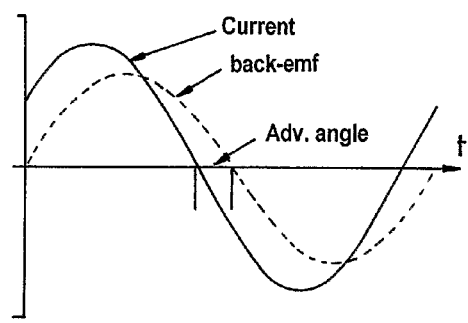

However, as is well known, if the current phase is advanced, as shown in FIG. 4b, so that it is no longer in phase with the back emf, but ahead of it by a phase advance angle $\theta_{adv}$ then the motor output torque varies as:

$$T = K_T I \cos \theta_{adv}$$

Figure 5:
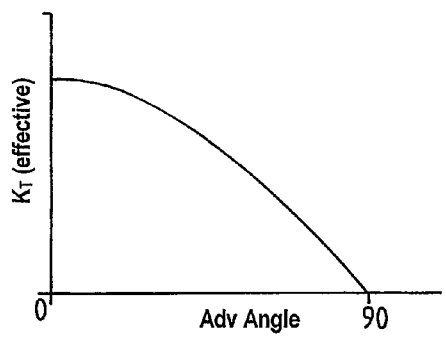
FIG. 5 is a graph showing the effect of phase advance angle on the effective torque constant of the motor of FIG. 1.

This produces an effective torque constant $K_{T\text{-}effective}$ that varies with the cosine of $\theta_{adv}$ as shown in FIG. 5.

Figure 6:
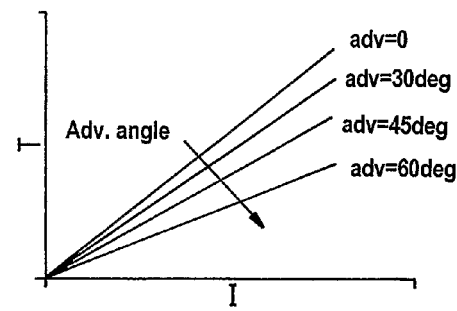
FIG. 6 is a graph showing the variation of torque with current in the motor of FIG. 1 with different phase advance angles.

Referring to FIG. 6, for any phase advance angle $\theta_{adv}$ the motor torque T is still proportional to the phase current I, but as $\theta_{adv}$ increases, the effective torque constant decreases, and so the torque for any given current decreases.

Figure 7:
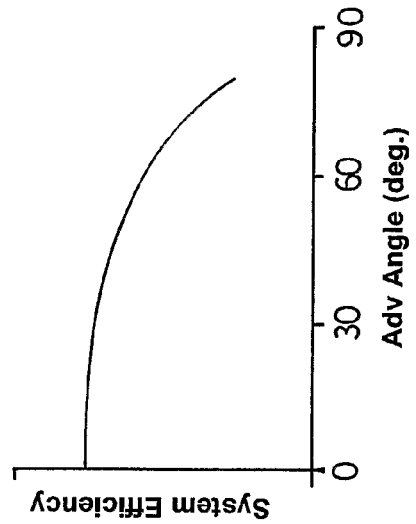
FIG. 7 shows losses in the system of FIG. 1 as functions of phase advance angle.
Figure 8:
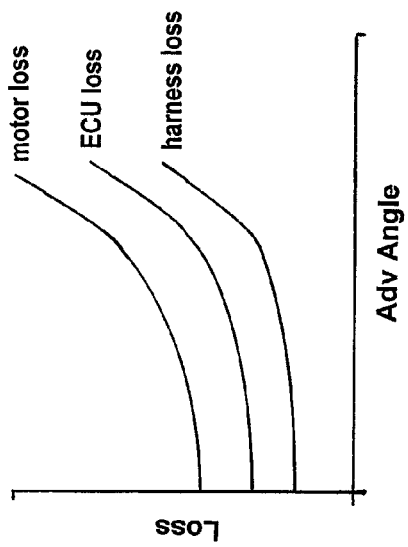
FIG. 8 shows the efficiency of the system of FIG. 1 as a function of phase advance angle.

Referring to FIG. 7, as the phase advance angle increases, losses in the motor 14, the drive circuit 8 and the harness 12 all increase, resulting in a decreasing system efficiency as shown in FIG. 8. However, increasing the phase advance angle can enable the motor to operate at higher speeds and output power as will now be described in more detail.

Figure 9:
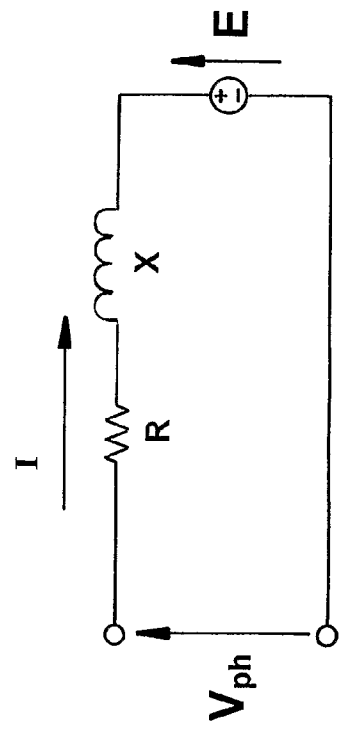
FIG. 9 shows an equivalent phase circuit for the motor of FIG. 1.

According to motor equivalent circuit theory, the applied phase voltage $V_{ph}$ is given by $$V_{ph} = E + I R_{ph} + j I X$$

where E is the back emf, I is the phase current, and X is the synchronous impedence. This is shown in the equivalent phase circuit of FIG. 9.

Figure 10A:
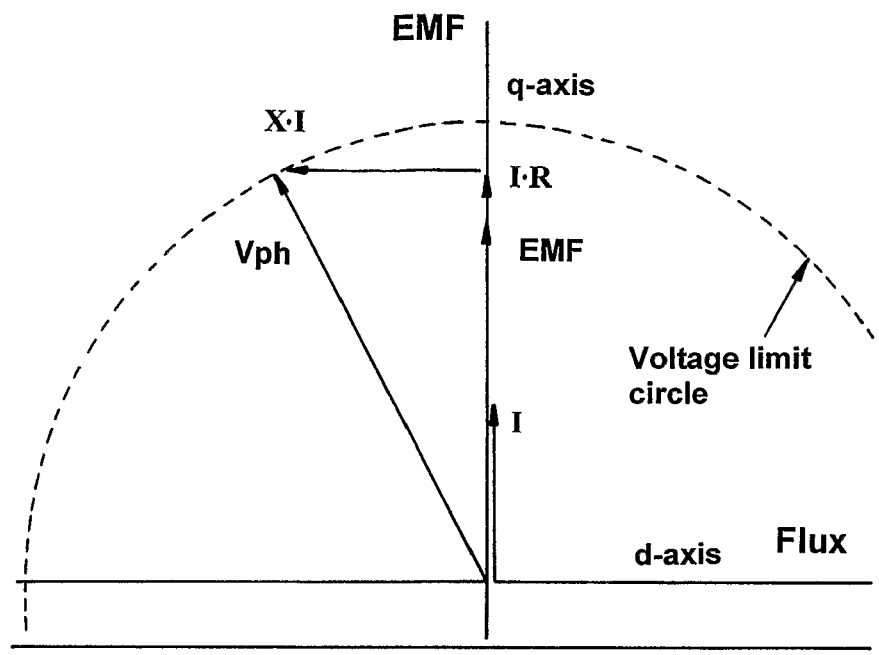
FIGS. 10a and 10b are phase diagrams for the motor of FIG. 1 with zero and non-zero phase advance angle.

These vector quantities can be represented in a motor phase diagram as shown in FIG. 10a. In these diagrams the d-axis is aligned with the magnetic flux of the rotor and the q-axis is perpendicular to the d-axis. With zero phase advance, the back emf is in phase with the phase current I, and the voltage XI is 90° out of phase. The voltages $V_{ph}$, IR, E and XI can therefore be represented as shown. However the back emf increases with motor speed, and $V_{ph}$ is limited by the ECU-dc$_{link}$ voltage, typically to about two thirds of the dc link voltage. Therefore the phase voltage $V_{ph}$ cannot extend beyond the voltage limit circle, and there is a maximum motor speed, determined by the maximum back emf, above which the motor cannot be driven.

Figure 10B:
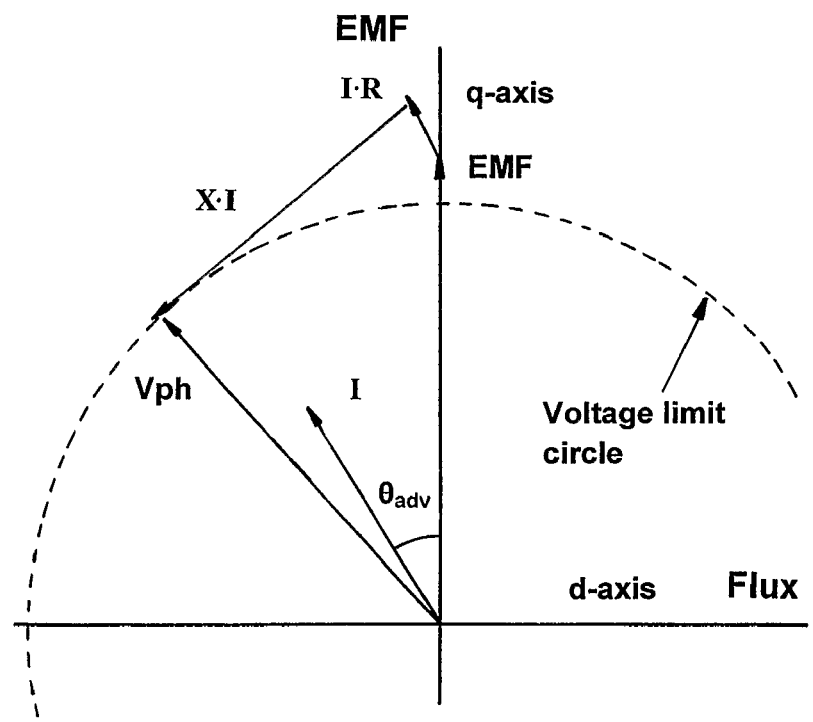
Figure 11:
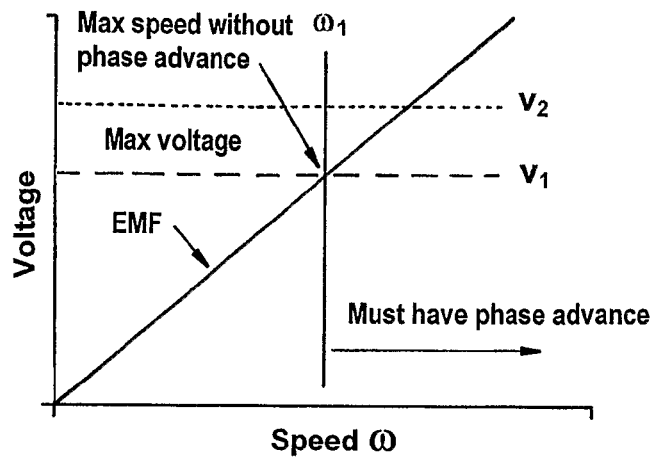
FIG. 11 shows the operating speeds at which phase advance is required.

However, referring to FIG. 10b, if a phase advance of angle $\theta_{adv}$ is introduced, then the current is not in phase with the back emf. This varies the phase of the IR and XI voltage vectors with respect to the back emf as shown. The result of this is that the magnitude of the back emf can be increased, and the vector sum of the voltages E, IR, XI still equal the $V_{ph}$ limit as shown. This means that the maximum possible output speed and power of the motor can be increased for any given ECU-dc$_{link}$ voltage. Referring to FIG. 11, the result of this is that for a fixed maximum ECU-dc$_{link}$ voltage $V_1$ there is a maximum motor speed $\omega_1$ which cannot be exceeded without phase advance. This is where the back emf, which increases with motor speed, equals the maximum possible ECU-dc$_{link}$ voltage $V_1$. For higher motor speeds, phase advance must be used.

Figure 12:
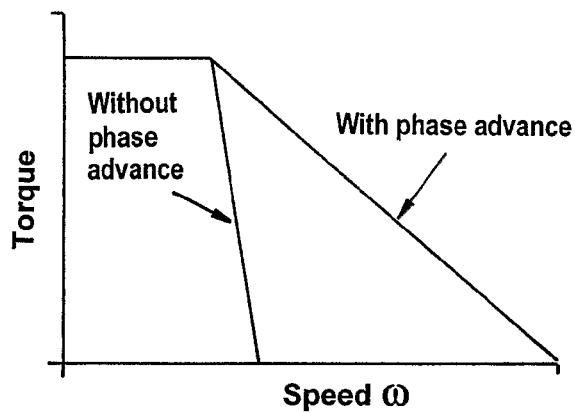
FIG. 12 is a graph showing variation of maximum torque with speed with zero and non-zero phase advance.
Figure 13:
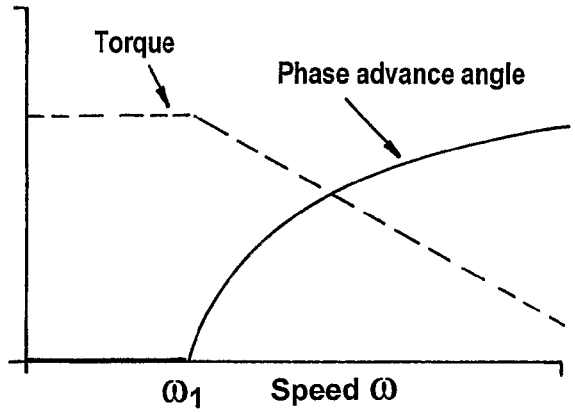
FIG. 13 is a graph showing how the phase advance angle can be varied with speed to increase torque at higher speeds.

A typical motor torque/speed curve can be plotted as shown in FIG. 12. As can be seen, with phase advance the operating area is greatly increased. Higher motor speeds can be obtained, and also higher torques for some motor speeds can also be achieved. A typical phase advance profile is shown in FIG. 13. The phase advance is maintained at zero up to a speed $\omega_1$, which is slightly lower than $\omega_1$ in FIG. 11, and then increased with increasing motor speed.

This results in a maximum torque that is constant up to speed $\omega_1$ and then decreases at a constant rate with increasing motor speed.

Figure 14:
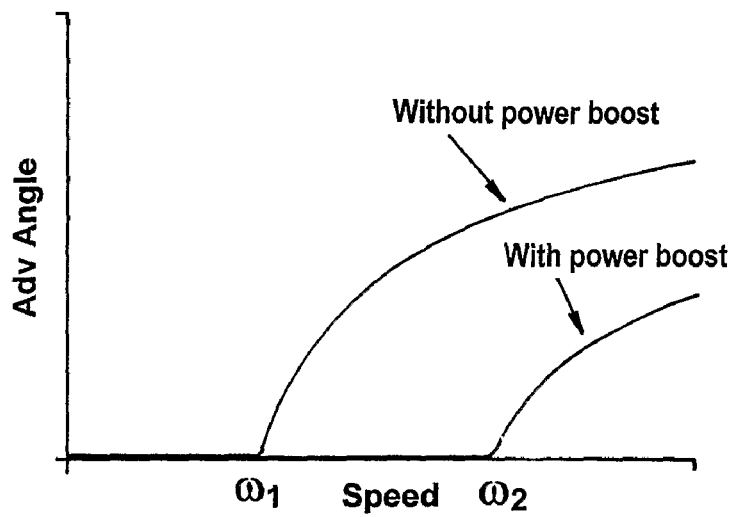
FIG. 14 is a graph showing the required phase advance as a function of speed in the motor of FIG. 1 with and without power boost.
Figure 15:
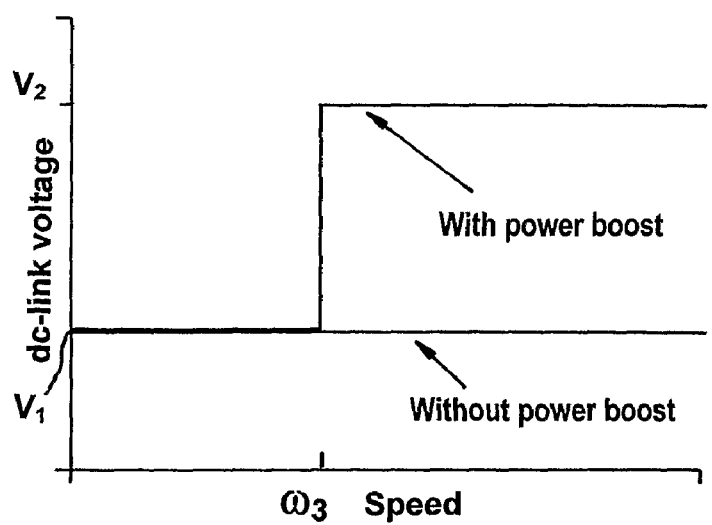
FIG. 15 is a graph showing the effect of power boost on the delink voltage of the system of FIG. 1.

Referring to FIG. 14, if voltage boost is applied using the voltage boost circuit 26 of FIG. 1, the torque that can be produced for any particular combination of motor speed and phase advance angle, at high speeds, is increased. Therefore, compared to the advance angle profile that is required without power boost, if power boost is used, the introduction of phase advance can be deferred to higher motor speeds. Referring to FIG. 15, in one example of a suitable voltage boost strategy, the dc-link voltage is kept at its basic un-boosted level $V_1$ up to a speed $\omega_3$ and then boosted to a higher level $V_2$ for all higher motor speeds. Further examples will be described in more detail below.

Figure 16:
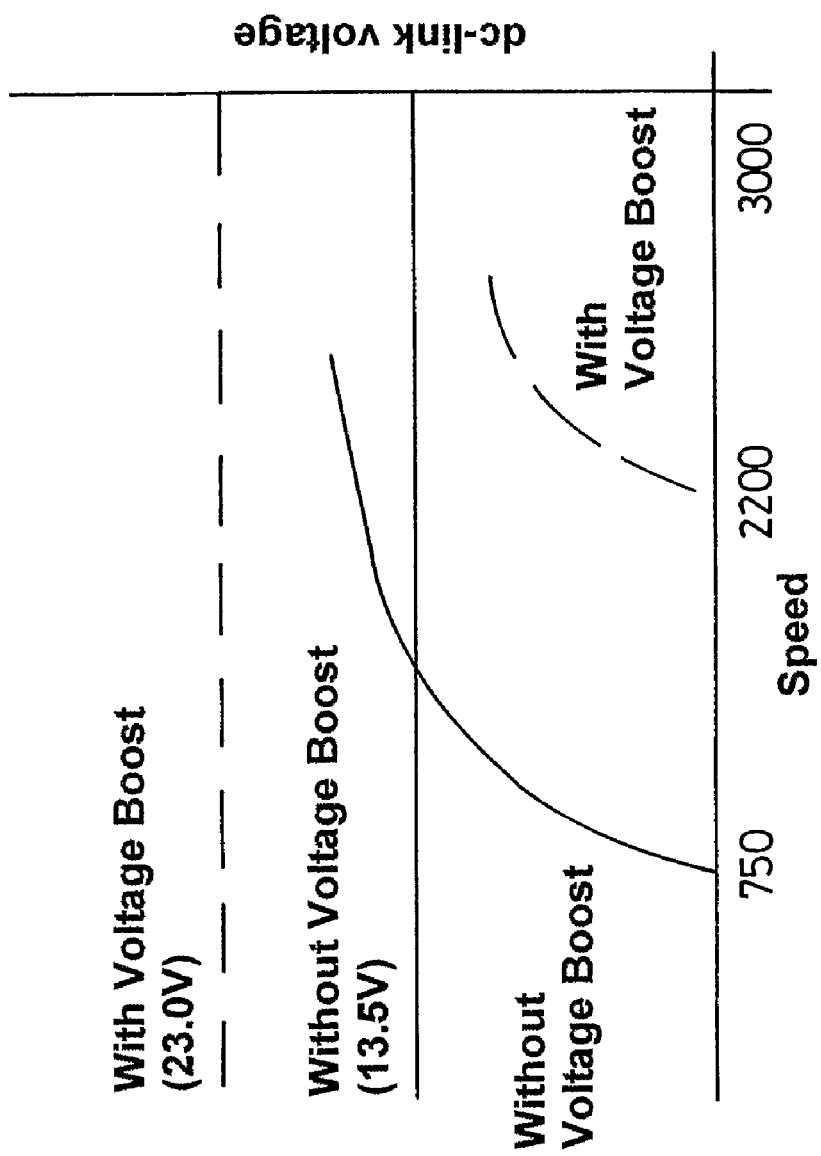
FIG. 16 shows the phase advance required as a function of speed both with and without voltage boost in the system of FIG. 1.

Referring to FIG. 16, in one example the system of FIG. 1 was simulated using an un-boosted ECU-dc$_{link}$ voltage of 13.5V and a phase advance angle that was kept at zero up to a speed of 750 rpm and then increased as shown in the solid line. FIG. 16 also shows simulated system performance when using a boosted ECU-dc$_{link}$ voltage of 23.0V with a phase advance angle that was kept at zero up to a speed of 2200 rpm and then increased as shown in the broken line. In each case the phase advance angle was controlled so that maximum power was delivered while restraining the battery current to a fixed upper limit. The motor type used in the simulation was a 12 slot/10 pole surface-mount, permanent-magnet brushless AC motor, as typically used in EPS systems.

Figure 17:
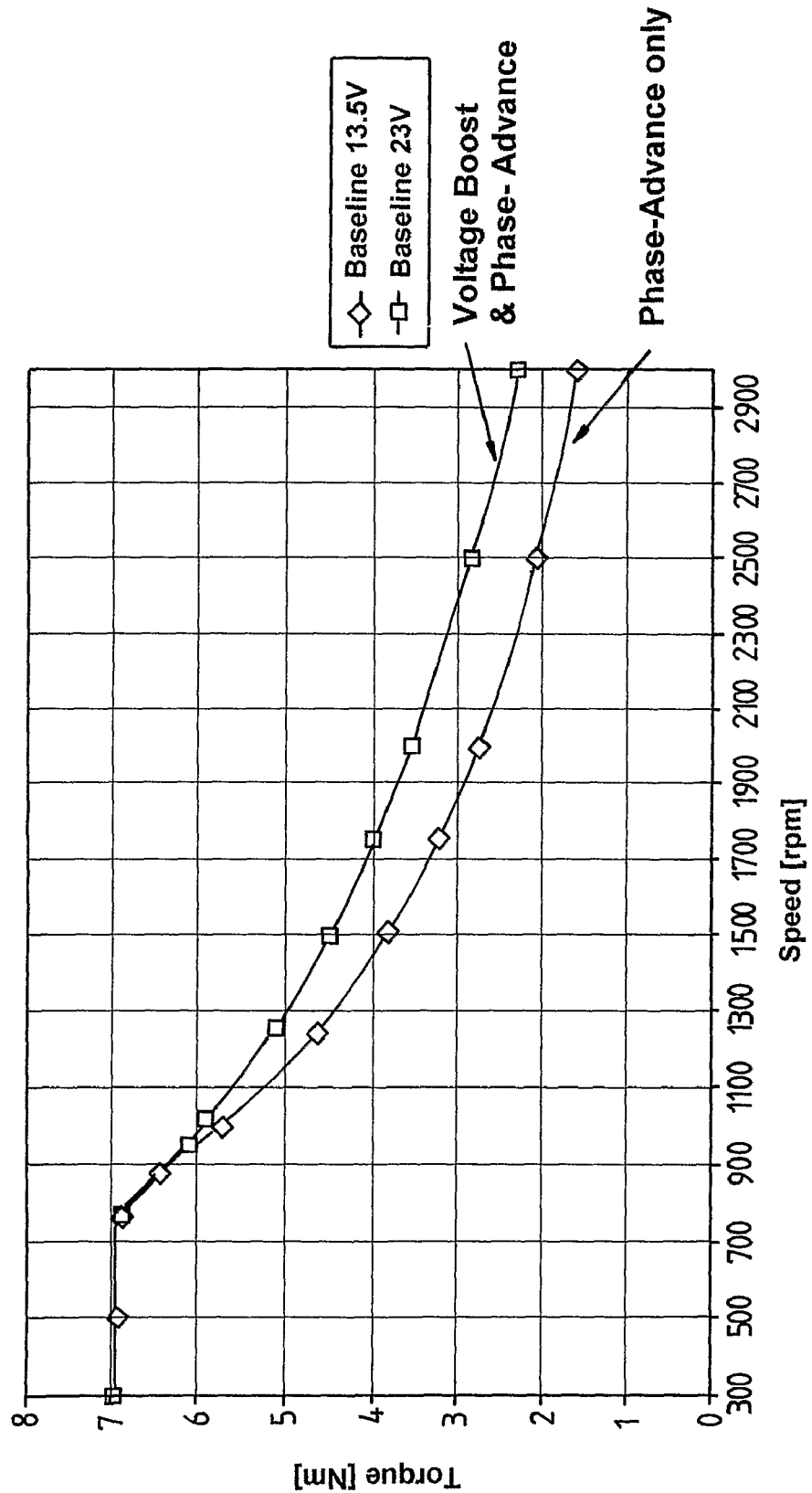
FIG. 17 shows torque/speed characteristics for the system of FIG. 1 using phase advance only and phase advance with voltage boost.

Referring to FIG. 17 it can be seen that, using the control strategies of FIG. 16, the torque produced with phase advance but no voltage boost is constant up to a knee point at about 750 rpm. Above that speed the torque starts to fall off nonlinearly at a rate that is initially quite high, but gradually decreases. If voltage boost is used and phase advance introduced at a higher speed, the speed at which the knee point occurs is increased slightly, and, thereafter, the torque falls off less rapidly with motor speed, being about 0.75 Nm higher for motor speeds over about 1500 rpm. If the efficiency of the voltage boost circuit can be increased, by minimising losses within it, the knee point can move to higher speeds.

Figure 18:
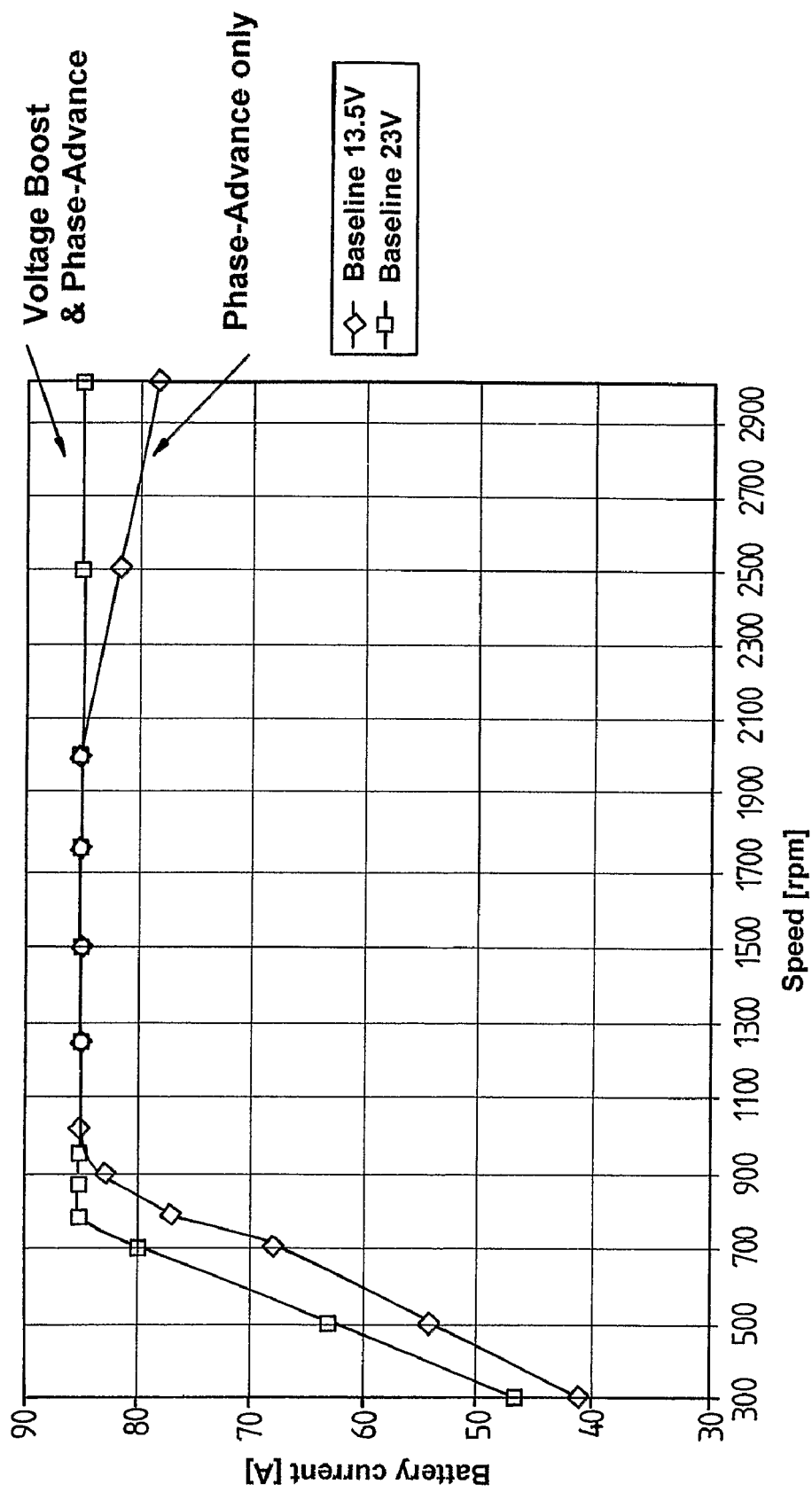
FIG. 18 shows battery current produced as a function of speed for the system of FIG. 1 using phase advance only and phase advance with voltage boost.

Referring to FIG. 18, where the baseline 13.5V un-boosted voltage is used, the battery current increases steadily up to speeds of about 900 rpm, then is held at the maximum current of 85 A up to speeds of about 2000 rpm, and then falls off gradually. If the boosted voltage of 23V is used, the current starts higher at low speeds, and increases at the same rate, reaching the limiting current of 85 A at about 750 rpm. It then stays at the limit current right up to the maximum tested speed of the motor, in this case about 3000 rpm.

Figure 19:
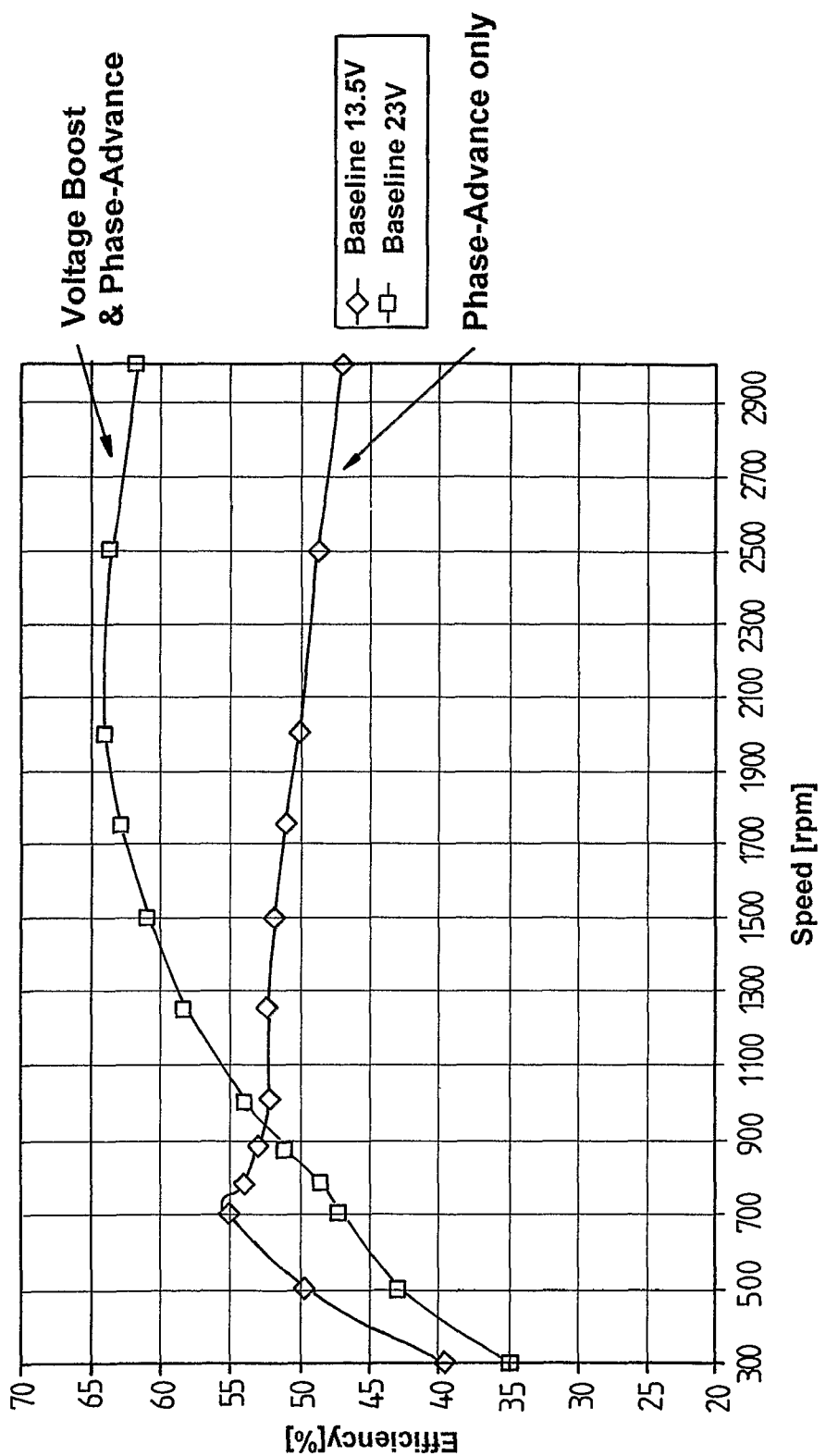
FIG. 19 shows system efficiency as a function of speed for the system of FIG. 1 using phase advance only and phase advance with voltage boost.

Referring to FIG. 19, the overall system efficiency without voltage boost starts at about 40% at a speed of 300 rpm, increases to about 55% at a speed of 700 rpm, and then falls off gradually at higher speeds, remaining between 45% and 55%. However, with voltage boost and phase advance together, the efficiency starts off lower, at around 35% at 300 rpm, but increases steadily reaching about 64% at 2000 rpm and then falling off gradually to about 62% at 3000 rpm. For speeds above about 950 rpm the efficiency is higher with voltage boost than without.

It can therefore be seen that the combination of phase advance and voltage boost is advantageous for motor speeds above, in this case, about 950 rpm.

Figure 20:
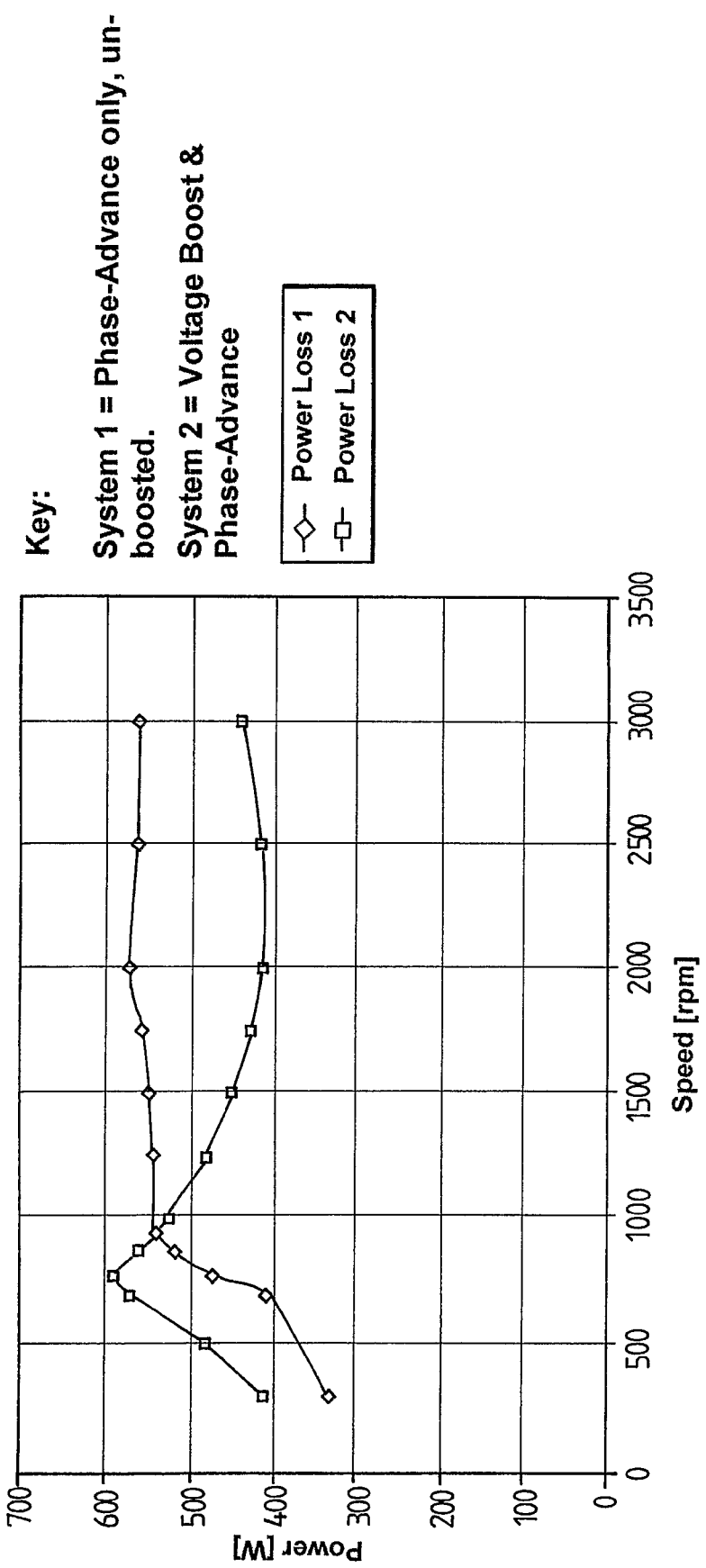
FIG. 20 shows system power loss as a function of speed in the system of FIG. 1 using phase advance only without boosted voltage, and phase advance with voltage boost.

Referring to FIG. 20, the total power losses in the system both with and without voltage boost can be calculated. The losses marked as system 1 are those for the system without voltage boost, and those for system 2 are those for the system with voltage boost. It can be seen that, for system 1, the power losses are roughly constant for speeds between 1000 and 3000 rpm, varying between about 550 and 580 W, whereas for system 2 the losses start at the same level of about 550 W at 1000 rpm, but fall off gradually to about 410 W at 2000 rpm before rising slightly to about 440 W at 3000 rpm.

Figure 21:
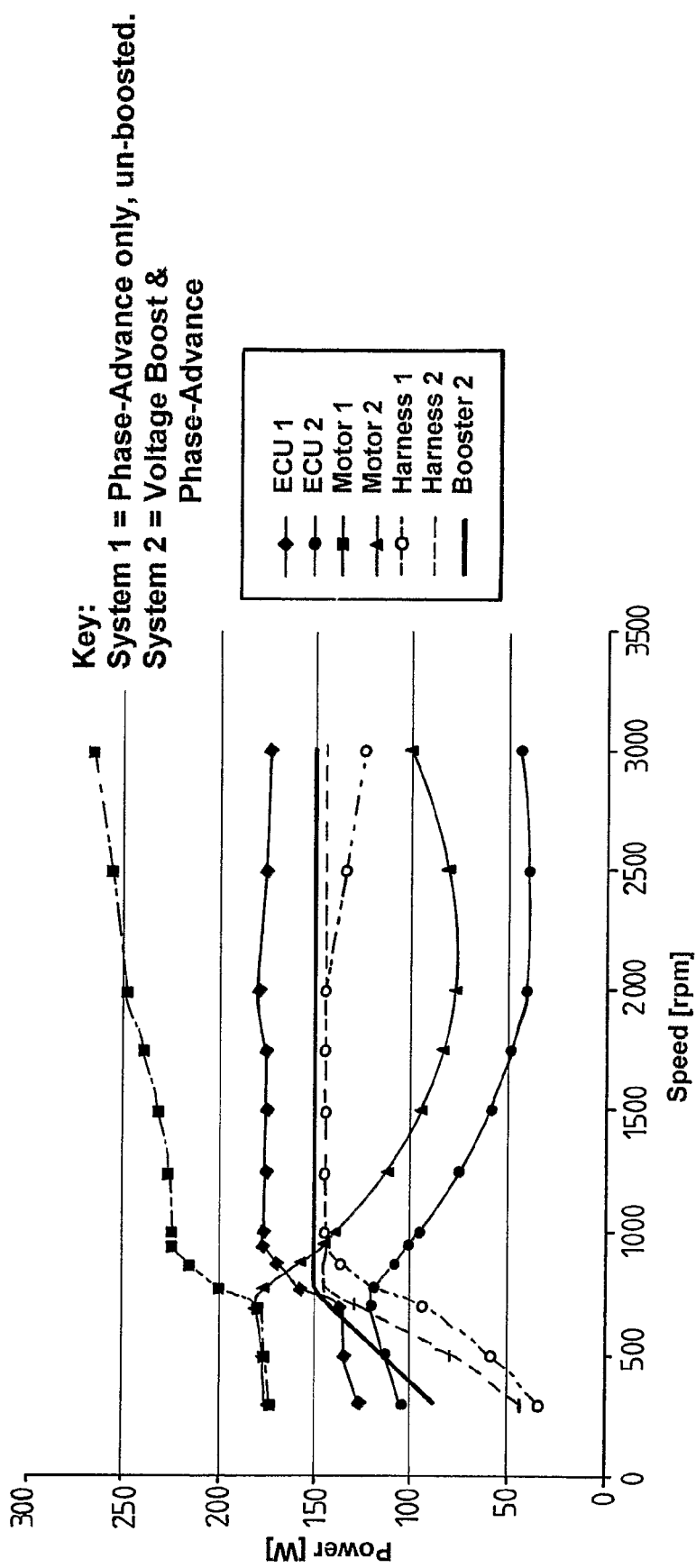
FIG. 21 shows power loss as a function of speed in parts of the system of FIG. 1 using phase advance only without boosted voltage, and phase advance with voltage boost.

Referring to FIG. 21, these losses can be broken down to separate out losses in the drive circuit 8, commonly referred to as an ECU (which includes the controller 30, the inverter 18, the filter 28, and the ECUdc$_{link}$ 20), losses in the motor 14, losses in the harness 12, and losses in the boost circuit 26. It can be seen that ECU losses with system 2 are substantially lower than with system 1, and increasingly so at higher speeds. Motor losses are also substantially lower with system 2 than with system 1, and harness losses are similar in the two systems. This is because the voltage boost circuit 26 is downstream of the harness 12. Losses in the boost circuit 26 are obviously only present in system 2. Overall, in the high speed range of operation considered, the losses from the boost circuit are more than compensated for by the lower losses in the other components, giving the overall system losses of FIG. 20.

Figure 22:
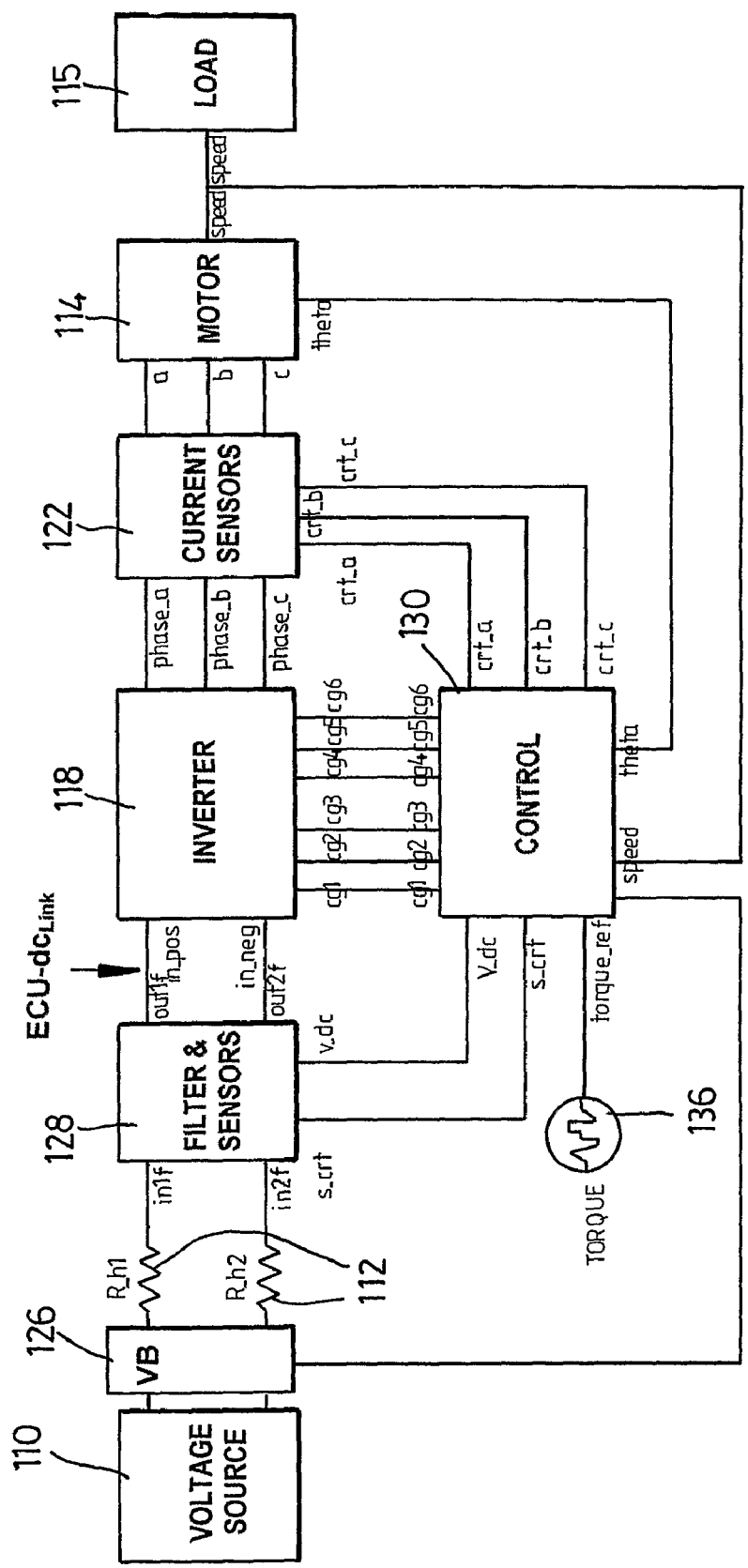
FIG. 22 is a schematic diagram of a system similar to that of FIG. 1 with an alternative voltage boost circuit position.

In the embodiment of FIG. 1, the voltage boost circuit 26 is part of the drive circuit 8 and is separated from the battery 10 by the harness 12. This is a practical implementation of the system as it allows the drive circuit to be installed as a single unit. In order to further improve the system's performance, the voltage boost circuit 26 could be placed at the battery, between the battery and the harness. FIG. 22 shows a system according to a second embodiment of the invention arranged in this manner. Components corresponding to those in FIG. 1 are indicated by the same reference numerals but increased by 100. In this system the losses in the harness are reduced by the addition of voltage boost, rather than being substantially unaffected as shown in FIG. 21.

Figure 23:
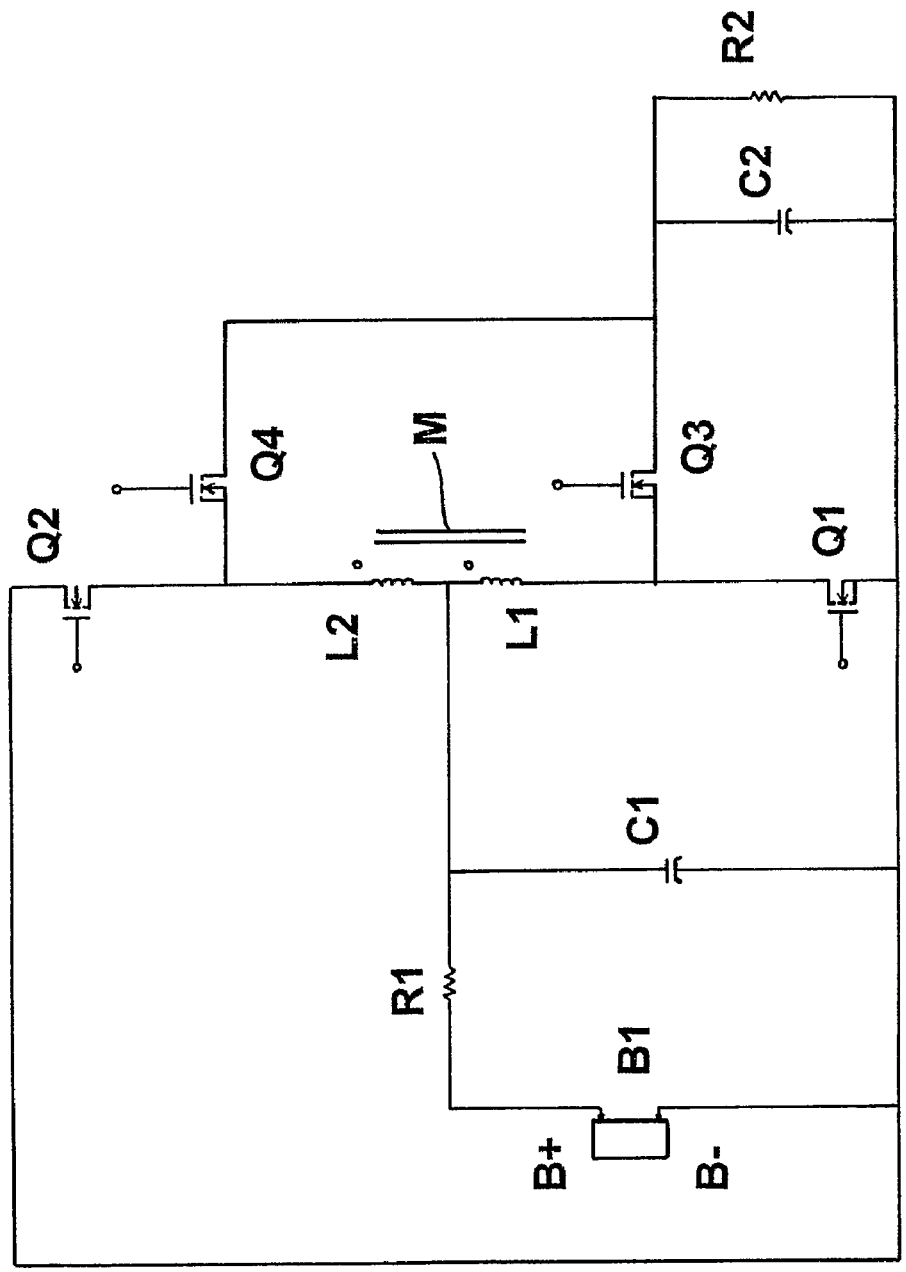
FIG. 23 is a circuit diagram of a voltage boost circuit used in the systems of FIGS. 1 and 22.

Referring to FIG. 23, as an example voltage booster, the voltage boost circuit comprises a quad switch synchronous push-pull voltage booster with a single bifilar wound magnetic component comprising two windings forming respective conductors L1, L2 wound on a common magnetic core M. The positive battery terminal B+ is connected through a resistor R1 to the mid point of, i.e. to a first end of each of, the two windings L1, L2. The negative battery terminal B− is connected to ground. The mid point of the two windings L1, L2 is connected to ground via a capacitor C1. The second end of the first winding L1 is connected via a first MOSFET switch Q1 to ground. The second end of the second winding L2 is connected via a second MOSFET switch Q2 to ground. The output of the circuit is represented as a load resistor R2 and capacitor C2 connected in parallel between ground on one side, and the second ends of the two windings L1, L2 through respective MOSFET switches Q3, Q4 on the other side.

The circuit can operate in four modes. In a passive mode Q1, Q2, Q3 and Q4 are in their OFF state, and current can flow through each of the windings L1, L2 simultaneously to the load R2 through the parasitic diodes of the two MOSFETS Q3 and Q4. The two flux fields in the autotransformer core M substantially cancel each other out due to the phasing of the windings and the autotransformer therefore effectively disappears from the circuit.

In an enhanced passive mode, Q1 and Q2 are in their OFF state and Q3 and/or Q4 is gated ON. The forward voltage drop $V_{be}$ associated with the parasitic diodes of Q3 and Q4 is then bypassed by the MOSFET ON resistance.

In an active mode one pair of MOSFETS Q1 and Q4, and the other pair Q2 and Q3 are alternately gated into their ON state. Thus Q1 and Q4 are gated synchronously with each other and are on at the same time and off at the same time, and Q2 and Q3 are gated synchronously with each other and are on at the same time and off at the same time. Q1 and Q2 are therefore never on at the same time. Therefore when one of Q1 and Q2 is on, it holds its end of the autotransformer winding close to battery low potential (ground) whilst the mid-point of the two windings is at battery high potential. Since the two windings have the same number of turns and are appropriately phased, the winding end that is not grounded is driven to a voltage approximately equal to twice that at the input terminals. That voltage is then passed to the output capacitor C2 and load R2.

Given that the inductance of the autotransformer is large when compared with the volt-seconds applied to it, the current ramp is a small proportion of the full load current. The current pulses in each MOSFET (and each inductor) are substantially rectangular and are sequentially summed at the input and output to form almost continuous waveforms. The ripple currents presented at the output and input are both filtered to some extent by the autotransformer inductances.

The duty-cycle fed to each of the MOSFET gates can be from 0% to slightly less than 50%. It is also possible to gate the MOSFETs on a proportionate control basis, which facilitates variable boost of the output voltage.

In a regenerative mode, which can be used if the circuit is connected to a load which can have a regenerative mode, then Q1 and Q2 can be gated into their OFF state, and Q3 and/or Q4 can be gated into their ON state. Current can then flow back from the regenerating load to the battery.

The non-isolated configuration which allows the passive mode, allows the power flow through the converter even when active MOSFET devices Q1, Q2 are shut off. This means that at low-load power levels when no voltage boost is required, the system can operate in the passive mode with no switching losses, preferably with Q3 and Q4 gated ON to reduce conduction losses.

Figure 24:
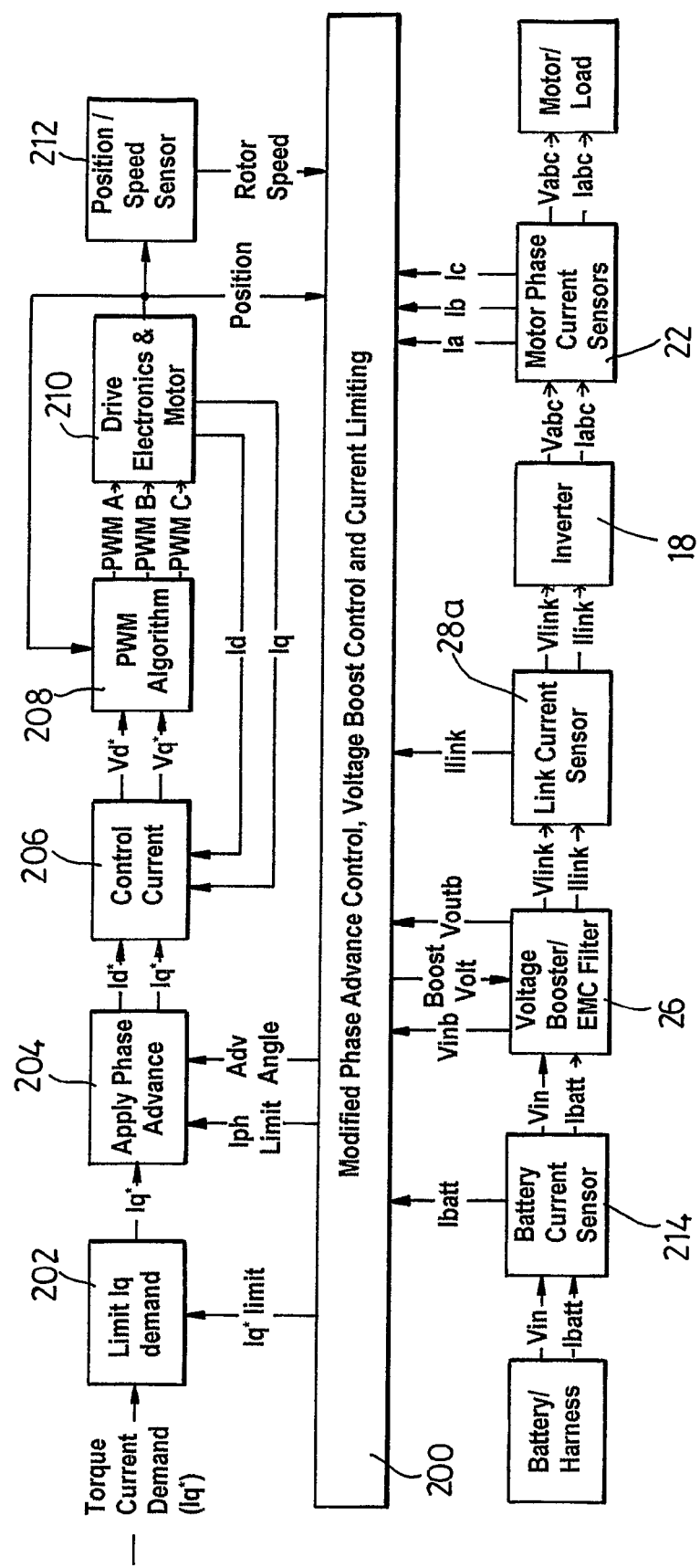
FIG. 24 is a functional block diagram of a known controller of the system of FIG. 1.

Referring to FIG. 24, the functional control blocks of the system of FIG. 1 will now be described. A main phase advance, voltage boost and current limiting control block 200 determines the phase advance, voltage boost and maximum battery current required under any given circumstances. A current limiting block 202 is arranged to receive a torque current demand dictated by the torque that is required from the motor 14, to receive a current limiting signal from the main control block 200, and to output a modified torque current demand that is reduced, if necessary, to the maximum current limit. The current is limited to a specified maximum level. At this stage the required current is defined purely as a q-axis current, which is the torque generating component of the current. A phase advance block 204 receives the modified q-axis current demand from the current limiting block 202 and also inputs from the main control block 200 indicating the required phase advance angle and the maximum phase current. The phase advance block 204 then determines the q- and d-axis currents that will provide the required total current and phase advance, and outputs these values to a current control block 206. This block 206 determines the d- and q-axis voltages that will be required to produce the required phase currents and outputs these values to a PWM algorithm 208. The PWM algorithm determines the PWM switching times for the switches in the inverter 18 that will produce the required voltages, and outputs control signals to the drive electronics control block 210 to indicate these switching times, which the drive electronics control block 210 then implements in the inverter 18. The position of the rotor of the motor 14 is detected by the rotor position sensor 24, and input by a position sensor block 212 to the main control block 200. The d- and q-axis currents are also measured by the current sensors 22 and fed back into the current control block 206 by the drive electronics control block 210.

A battery current sensor 214 measures the battery current $I_{bat}$, and inputs this value into the main control block 200. The voltage booster circuit 26 receives a voltage boost demand signal from the control block 200 and boosts the battery voltage to a boosted level which is applied to the ECU. An EMC filter, that could be integrated in the voltage boost circuit 26, conditions the input power to the inverter 18. In a multi-sensor system, the link sensors 22 measure the link currents and input the values of these to the main control block 200. For a single sensor system, the currents in the phases are determined from the current sensor 214 in the dc link. The battery current sensor 214 can be omitted and the battery current estimated as will be described in more detail below.

The main control block 200 can therefore control the voltage boost and the phase advance, and thereby control the current in motor phases. This can provide increased efficiency and hence increased power output and increased maximum motor speed as described above.

Figure 25:
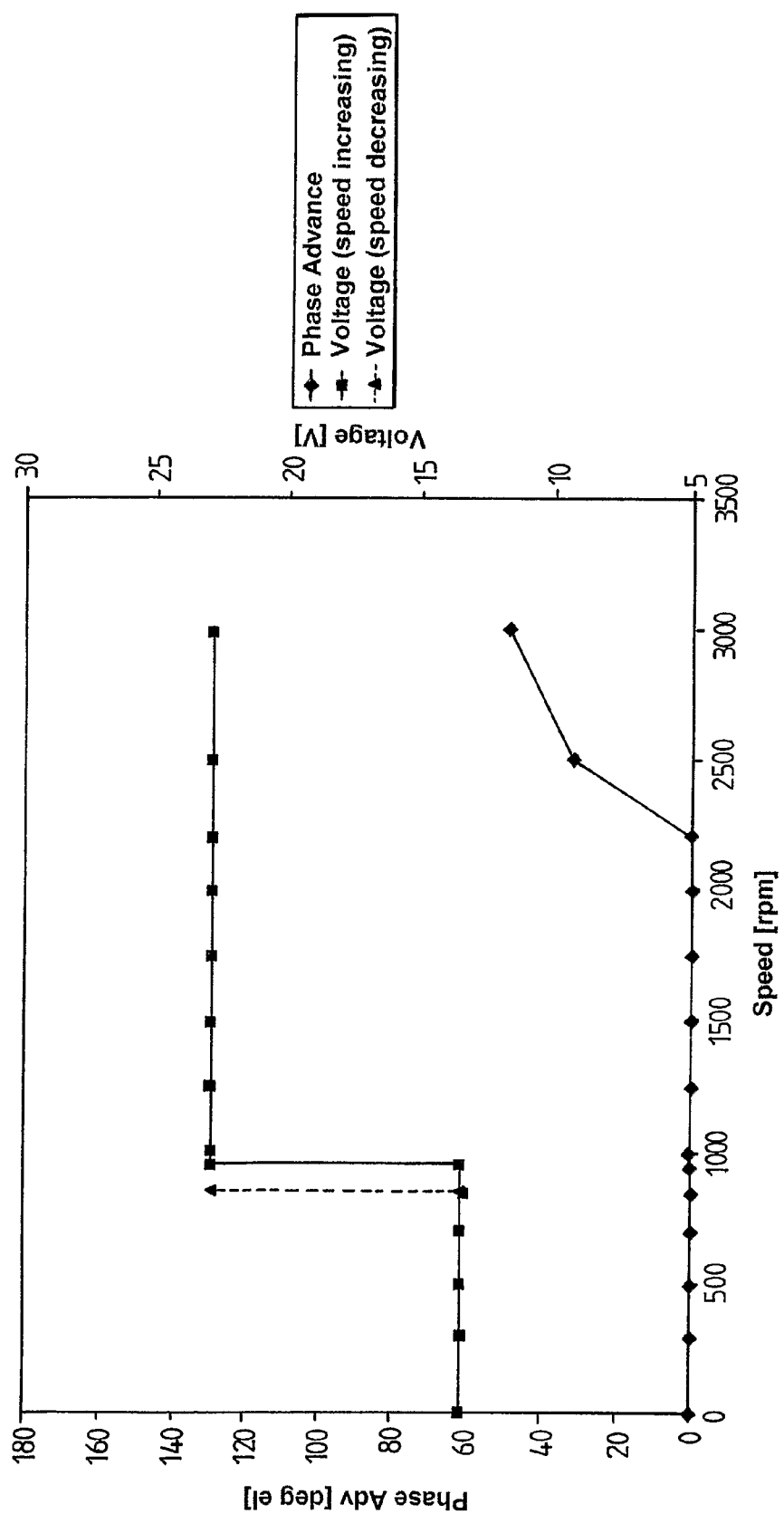
FIGS. 25, 26, 27, 28, 29 and 30 are graphs showing examples of dc-link voltages and phase advance angles used in the system of FIG. 1.

Referring to FIG. 25, one example of a simple control strategy that can be implemented in the system of FIG. 1 comprises using a simple stepped voltage boost, with zero voltage boost for speeds up to a first predetermined limit of 950 rpm, and at speeds above that limit applying a constant voltage boost that increases the DC link voltage, in this case from 13.5V to 23V. The phase advance is kept at zero for speeds up to a second, higher predetermined speed of 2200 rpm, and then increased steadily at higher speeds, reaching 30° at 2500 rpm and about 50° at 3000 rpm. Hysteresis can be added to the voltage boost step, as shown in the broken line, so that with increasing speed, the voltage boost is brought in at one speed, in this case 950 rpm, but with decreasing speed the voltage boost is maintained down to a slightly lower speed, in this case 850 rpm, so as to reduce chatter and acoustic noise around the switch point. This control method is simple to implement, but can still suffer from control chatter due to the sharp voltage boost transition.

Figure 26:
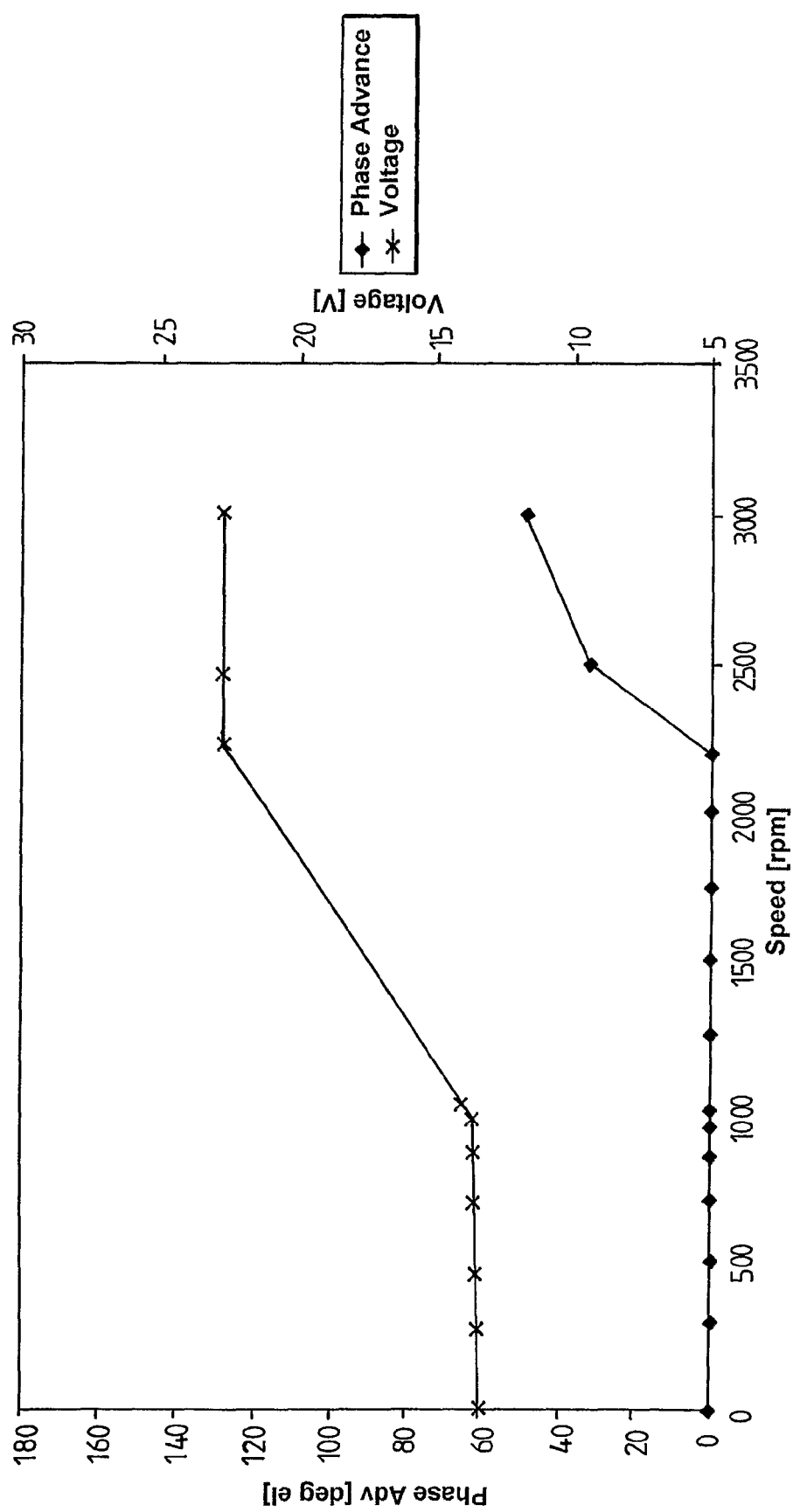
Figure 27:
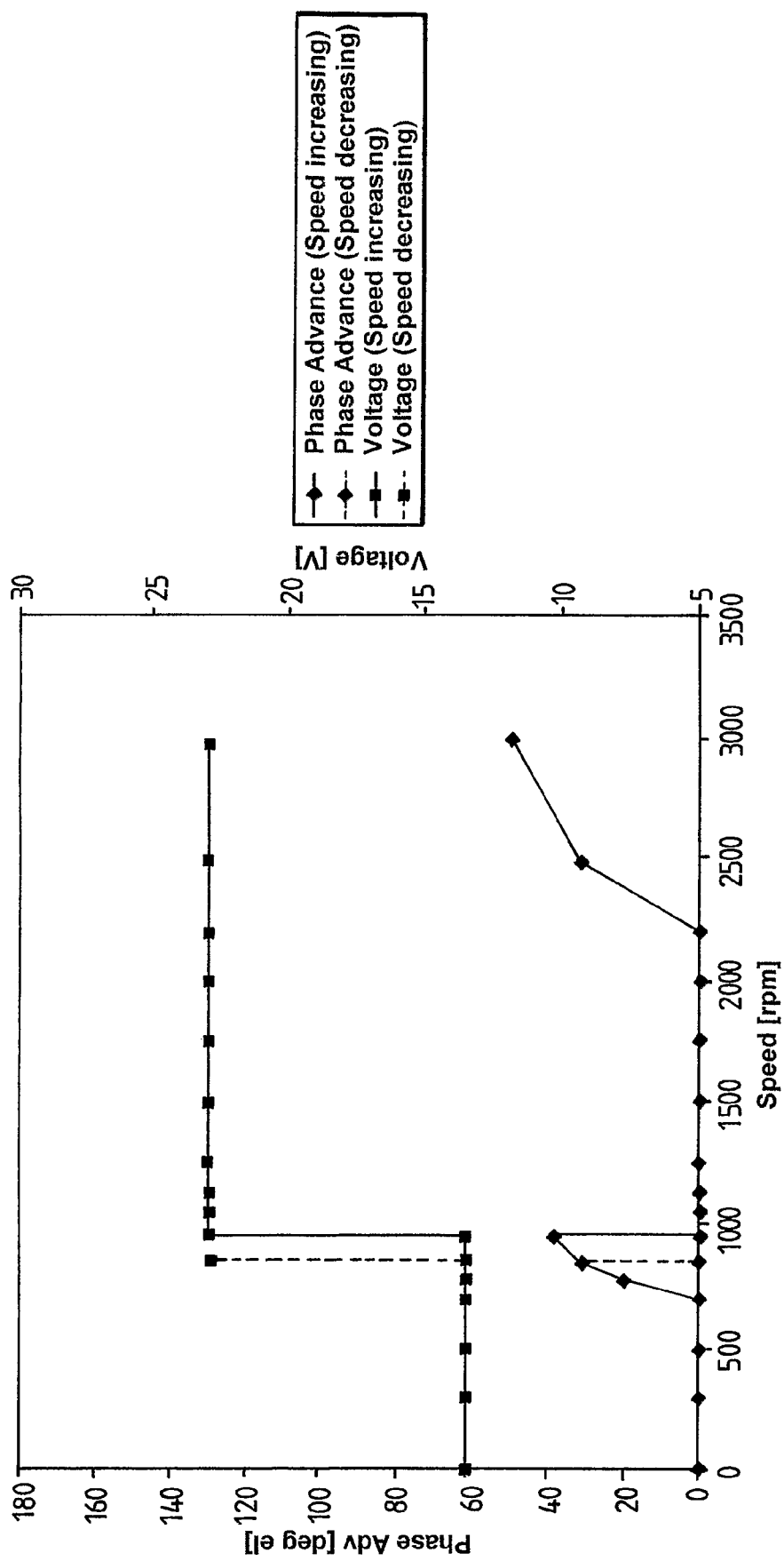

Referring to FIG. 26 in a second control strategy the phase advance is the same as in the first, but the voltage boost is introduced gradually. For low speeds up to a first predetermined speed of 950 rpm no voltage boost is applied. Then between 950 and a second higher predetermined speed of 2200 rpm the voltage boost is increased with increasing speed, until the link voltage reaches 23V at 2200 rpm. For higher speeds above 2200 rpm the voltage boost is constant with the DC link voltage kept at 23V. It will be noted that the second predetermined speed of 2200 rpm is the speed at which the phase advance is introduced. This strategy is also reasonably simple to implement, and has the advantage that the voltage boost is increased gradually which decreases control chatter and acoustic noise. Referring to FIG. 27, in a third control strategy, the voltage boost is controlled in the same way as in the first strategy. The phase advance is also increased in the same way for speeds above the second predetermined speed of 2200 rpm. However phase advance is also introduced over a range of lower speeds up to the point at which the voltage boost is introduced. Specifically in this example the phase advance starts to increase at a speed of 750 rpm up to a peak of 40° at a speed of 950 rpm, where it is returned to zero for speeds between 950 and 2200 rpm. As with the voltage boost, hysteresis is introduced so that, for decreasing speeds below 2200 rpm, the phase advance is maintained at zero until the speed reaches 850 rpm, when it is increased to 35° and then decreases down to zero at a speed of 750 rpm. This strategy has the advantage of highest efficiencies being maintained at speeds just below the voltage-boost cut-in speed; i.e. inefficiencies incurred by the use of phase-advance are less than those incurred by activating the voltage-boost circuit. However it can suffer from chatter around the sharp voltage boost and phase advance transitions.

Figure 28:
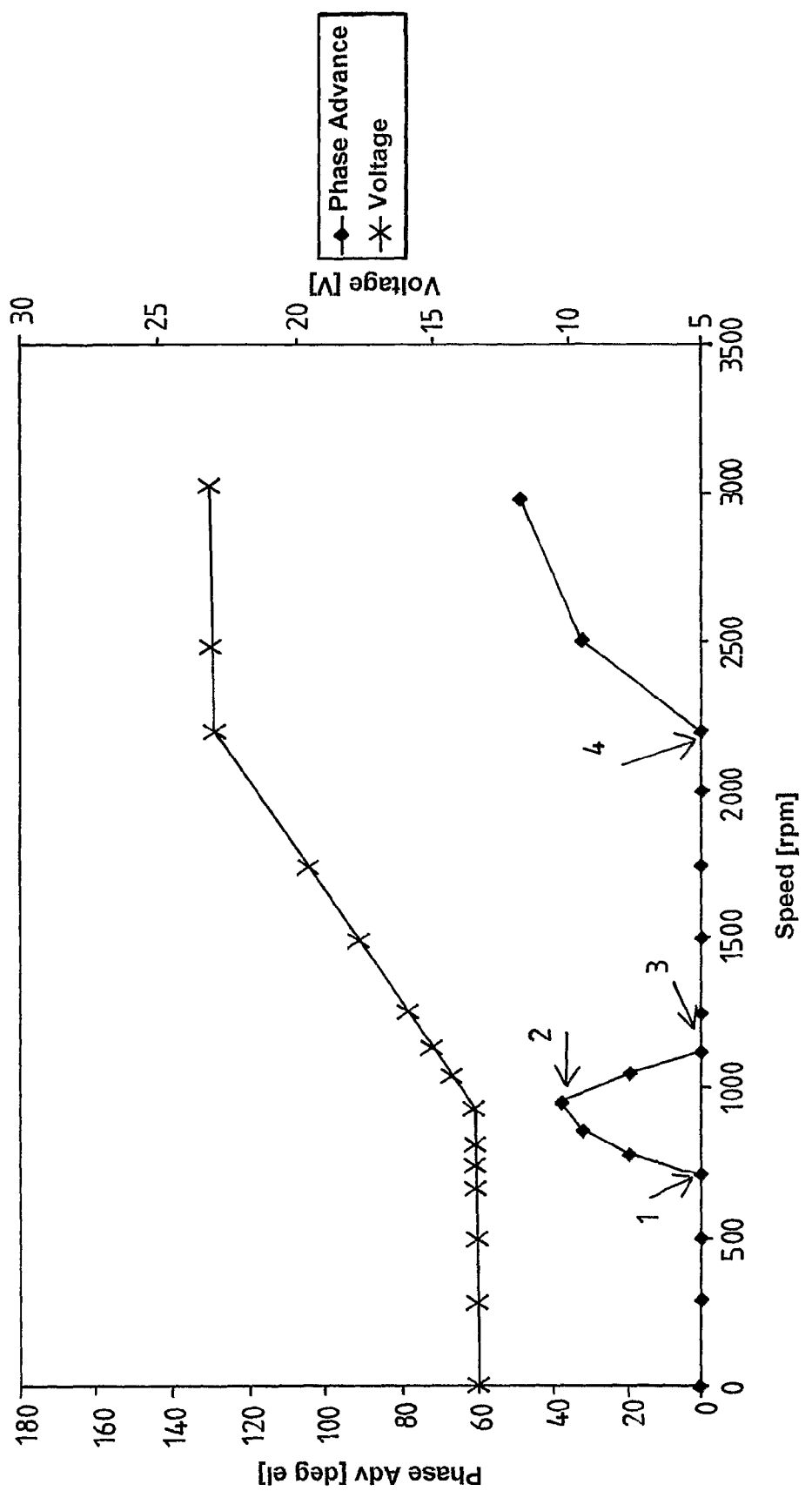

Referring to FIG. 28, in a fourth control strategy, the voltage boost is the same as in the second strategy. The phase advance is zero up to a speed of 750 rpm, and then increases with increasing speed up to a maximum of 40° at a speed of 750 rpm, and then decreases down to zero at a speed of 1125 rpm. It then remains at zero for speeds between 1125 and 2200 rpm where it starts to increase as in the previous strategies. This strategy has the advantage that there are no step changes in either voltage boost or phase advance, and therefore chatter is reduced. It also maintains highest efficiencies at speeds just below the voltage-boost cut-in speed.

Figure 29:
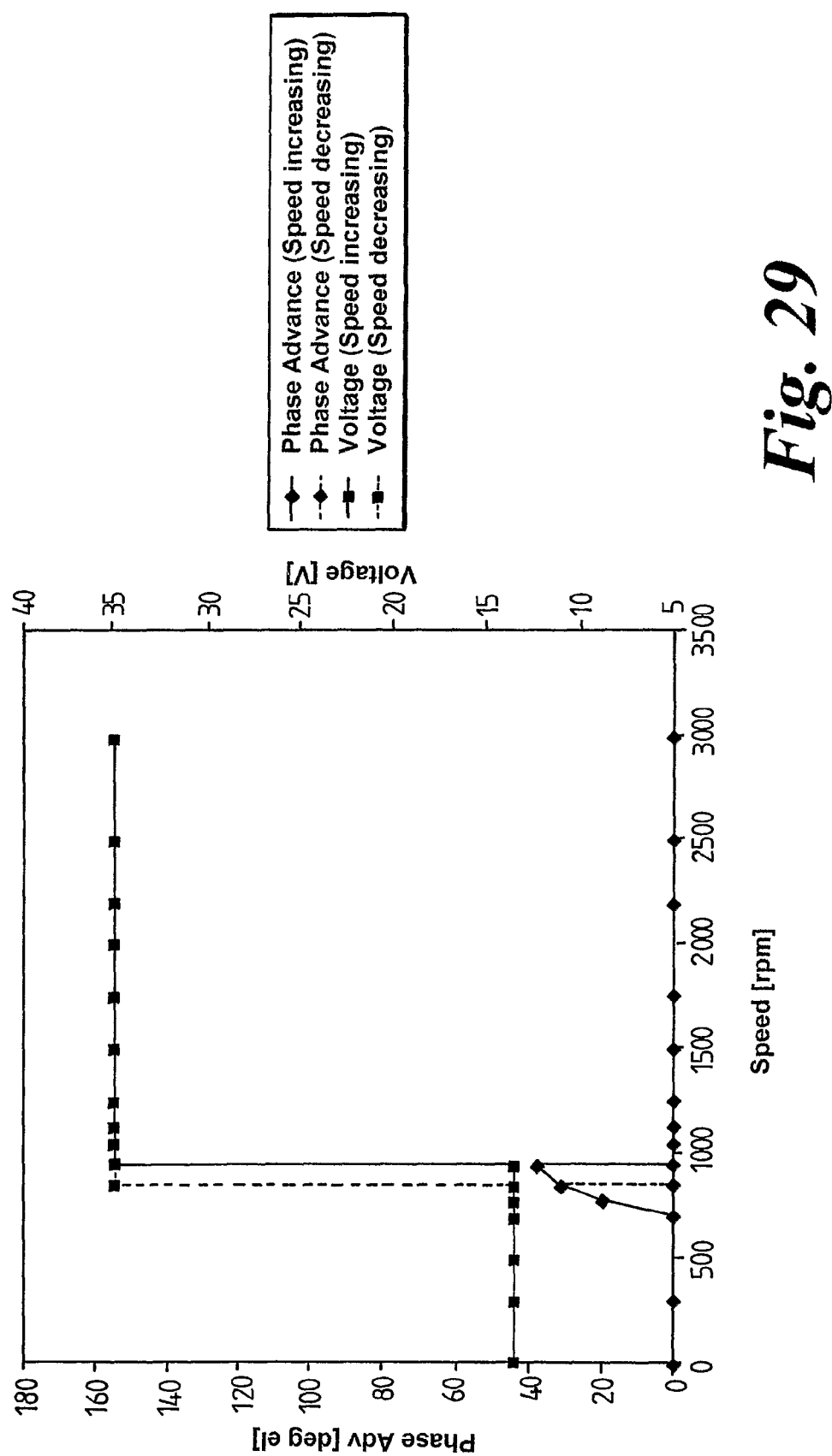

Referring to FIG. 29 in a fifth control strategy the voltage boost is introduced in a stepped manner at around 950 rpm, and the phase advance is increased over a range of speeds around 950 rpm as in FIG. 27. However, this strategy differs from that of FIG. 27 in that the voltage boost is higher, raising the boosted voltage to 35V. This allows the phase advance to be kept significantly lower at high speeds than in the strategy of FIG. 27, or indeed kept at zero for higher motor speeds as shown in FIG. 29: thus leaving its introduction to optimise efficiency about the knee-point only.

Figure 30:
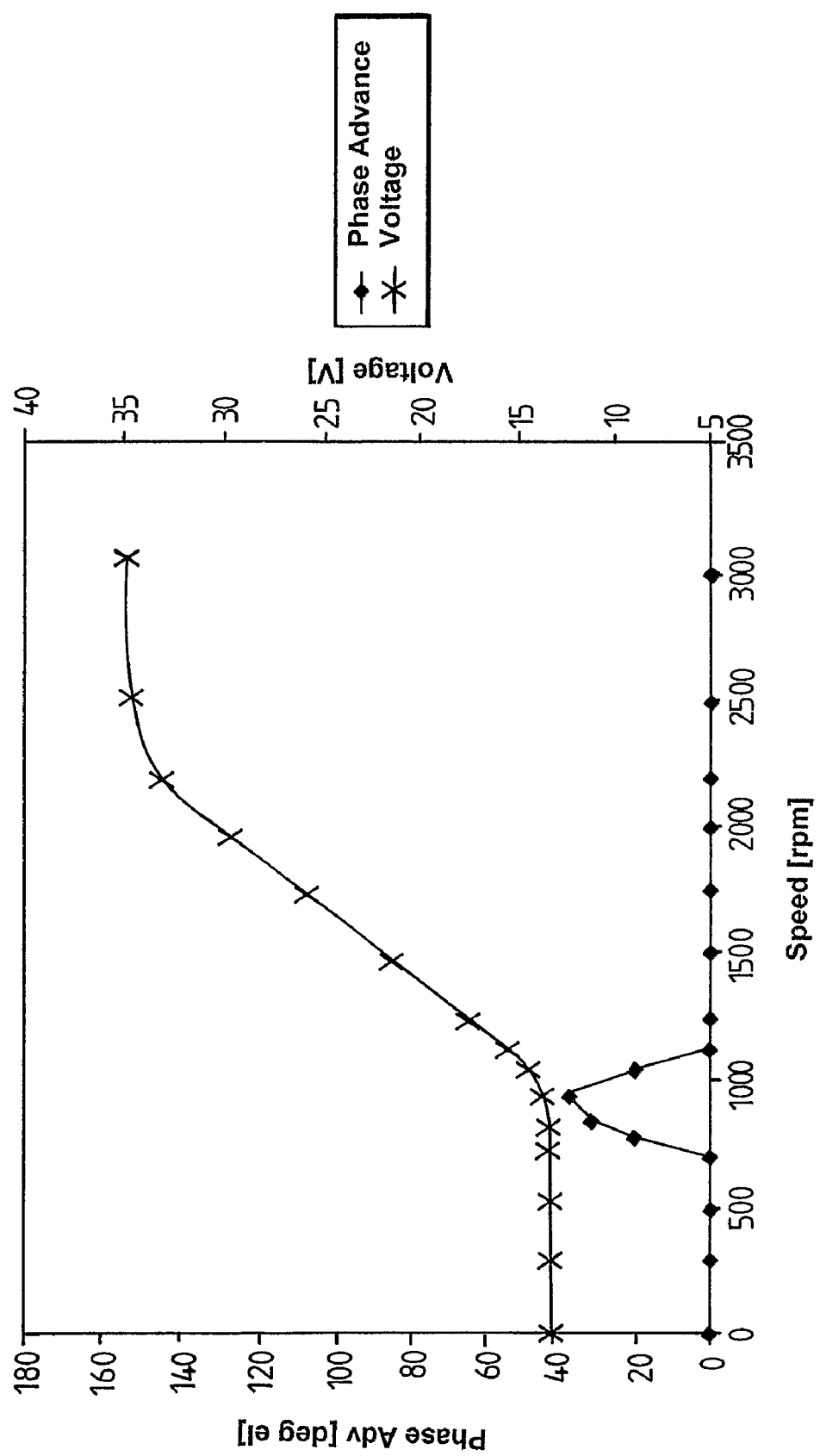

Referring to FIG. 30, in a sixth control strategy the voltage boost is introduced gradually as in the strategy of FIG. 28, with phase advance introduced over a range of motor speeds from 700 to about 1100 rpm. However in this case the voltage is boosted to a higher level, reaching 35V at motor speeds over about 2500 rpm, and consequently the introduction of phase advance at higher speeds can be avoided altogether, as shown in FIG. 30, thus leaving its introduction to optimise efficiency about the knee-point only.

Figure 31:
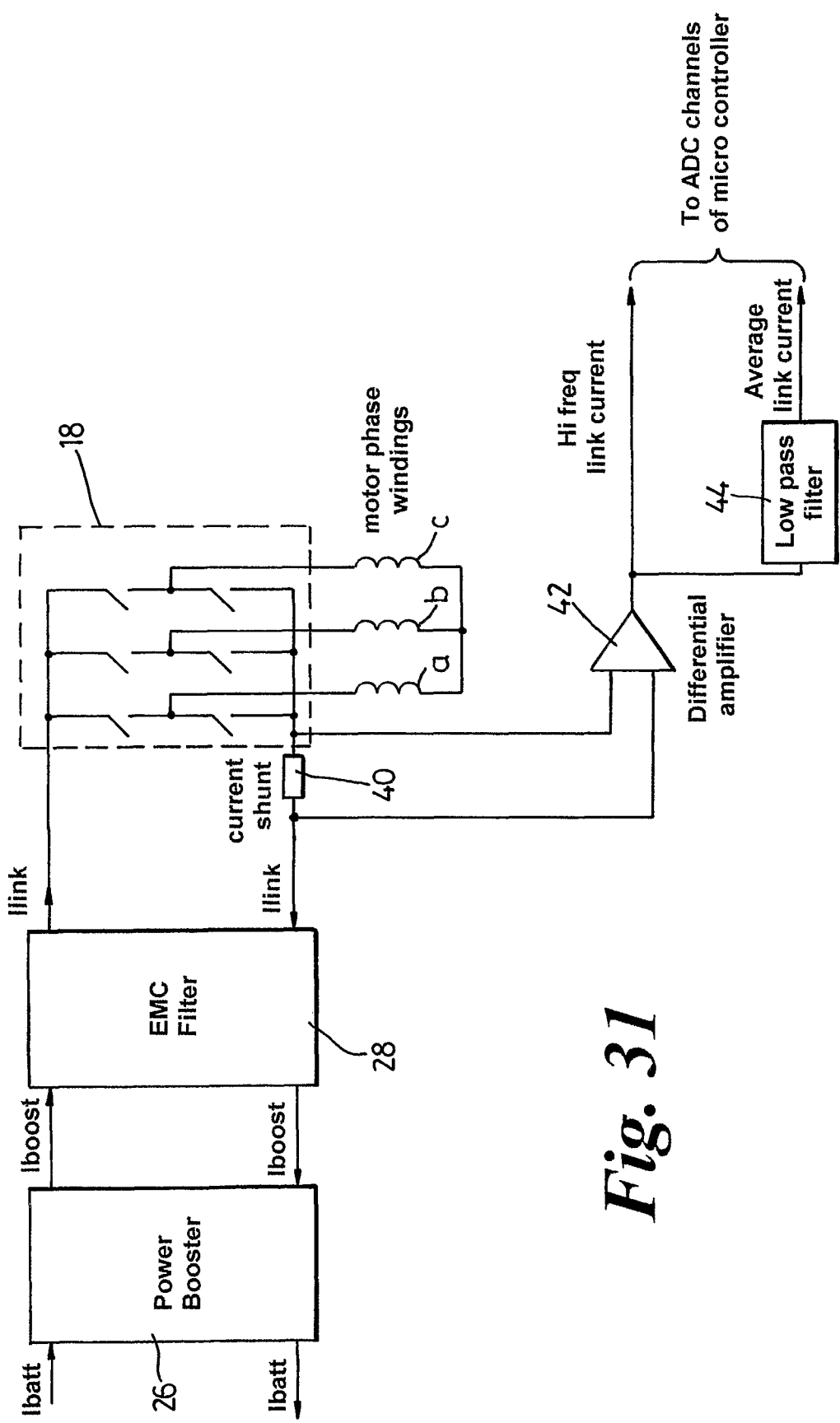
FIG. 31 is a circuit diagram of a system for estimating battery current in the system of FIG. 1.

In order that the controller 30 can control the battery current, it is useful if the battery current can be measured or estimated. In a modification to the embodiments described above the battery current can be estimated from the dc link current measurement using a circuit as shown in FIG. 31. Specifically a current shunt 40 is provided in the negative dc link between the inverter 18 and the EMC filter 28a which forms part of the filter and sensor group 28 as shown in FIG. 1. The dc link current $I_{link}$ flows through this shunt 40.

A differential amplifier 42 is connected across the shunt 40 and its output is fed to an ADC channel of the controller 30. This is used to measure the instantaneous current in the shunt 40 at precise times, so as to use the measured values to calculate the current in each of the motor phase windings a, b, c in known manner. However, the output from the differential amplifier 42 is also input to a low pass filter 44, the output of which is input to a further ADC channel of the controller 30. The output from the low pass filter is in effect an averaged measure of the dc link current $I_{link}$. Assuming that the leakage currents in the electrolytic output capacitors of the EMC filter are small, the average output current $I_{boost}$ of the power booster is equal to the average link current $I_{link}$.

The battery current $I_{batt}$ can be estimated as follows:

$$I_{batt} = (V_{outb} * I_{link}) / (V_{inb} * \text{effic})$$

where:
$V_{outb}$=output voltage of power booster
$V_{inb}$=input voltage of power booster
effic=efficiency of power booster (its value is stored in the look-up table)

The output voltage of the power booster is controlled by the controller 30 and the input voltage is known by the controller 30. The efficiency of the power booster depends on the input voltage, the output voltage, power level, and temperature and is stored in a look-up table in the controller.

As an alternative to the battery current estimation system of FIG. 30, a separate battery current sensor can be added to the system that provides a direct measurement of the battery current as an input to the controller 30. As a further alternative, the battery current is estimated for all conditions of the system, and the controller parameters are tuned so as to ensure that the battery current does not exceed a predetermined level.

In the control strategies described above, there are a number of parameters that will influence the battery current that is used to provide a given torque for a given motor speed. It is therefore possible to use various parameters to limit the battery current. This can be achieved in a number of ways.

Figure 32:
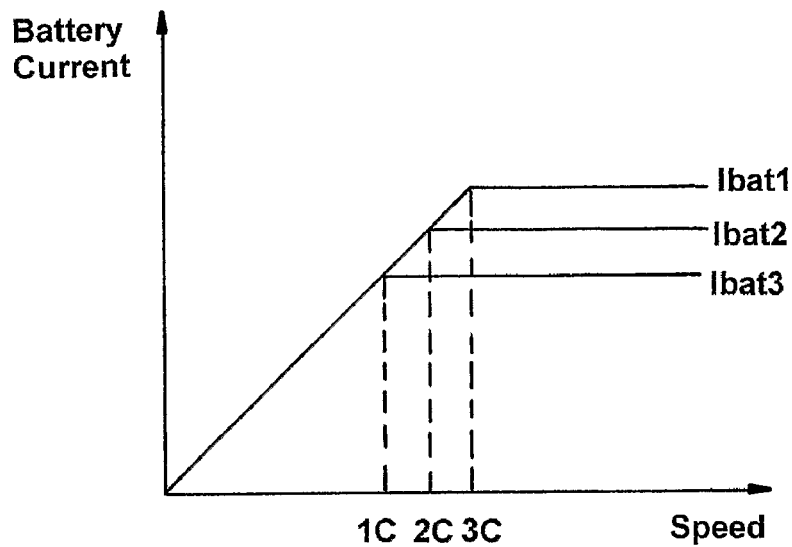
FIG. 32 shows a linear relationship between battery current and motor speed.

Referring to FIG. 32, battery current generally increases in a substantially linear manner with motor speed. Therefore if the battery current is to be limited, it will normally increase with motor speed up to its limit, and then be held at that limit as the motor speed increases further.

Figure 33:
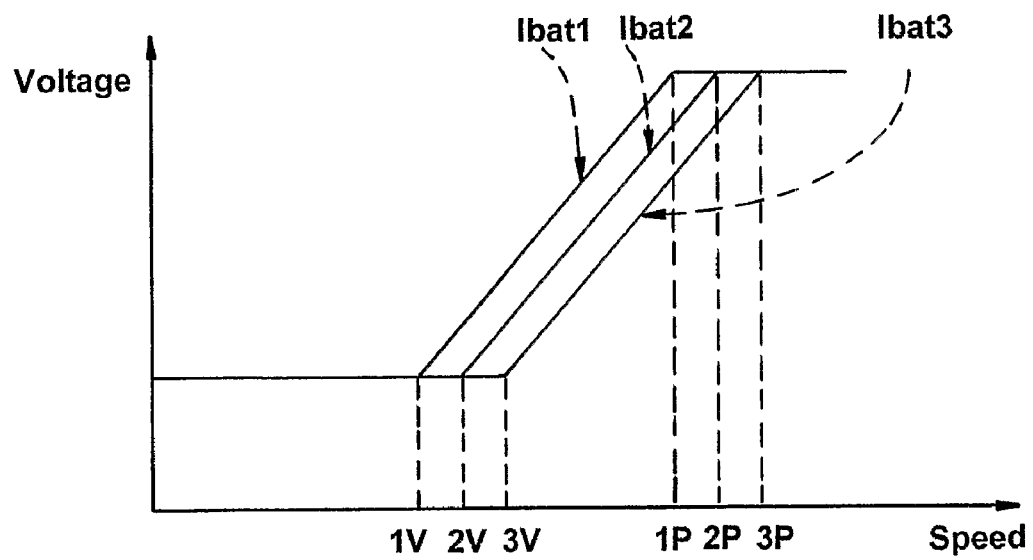
FIG. 33 shows a voltage boost strategy depending on motor speed.
Figure 34:
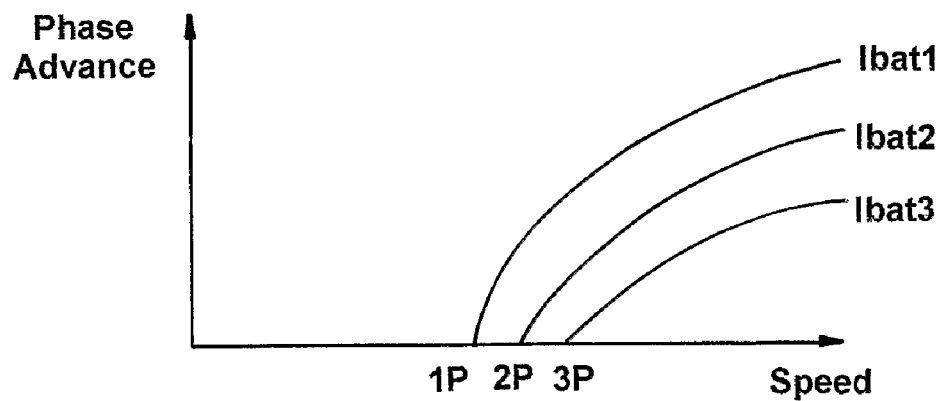
FIG. 34 shows a phase advance strategy depending on motor speed.

Referring to FIG. 33 the voltage boost in the strategy of FIG. 26 can be varied so that it takes place at different motor speeds. In the examples shown it is increased from the nominal voltage to a maximum at the same rate, but beginning at three different motor speeds 1V, 2V, 3V and reaching the maximum at three different speeds 1P, 2P, 3P. Each of these voltage boost strategies is arranged to maintain the battery current at a respective constant level $I_{bat1}$, $I_{bat2}$, $I_{bat3}$ over the range of motor speeds at which the voltage boost is increasing. Referring to FIG. 34, the phase advance control strategy can also be varied together with the voltage boost strategy so that it is introduced at the motor speed 1P, 2P, 3P at which the voltage boost reaches its maximum value, and increases with motor speed at higher speeds in the same manner as the strategy of FIG. 26. Again, each of the three phase advance control strategies is arranged to maintain the battery current at the same level $I_{bat1}$, $I_{bat2}$, $I_{bat3}$ for speeds above 1P, 2P, 3P as the respective voltage boost strategy does below those speeds. It will therefore be understood that, by controlling the voltage boost and phase advance over the full range of motor speeds, the battery current can be limited to a chosen maximum value over the full range of possible motor speeds.

Figure 35:
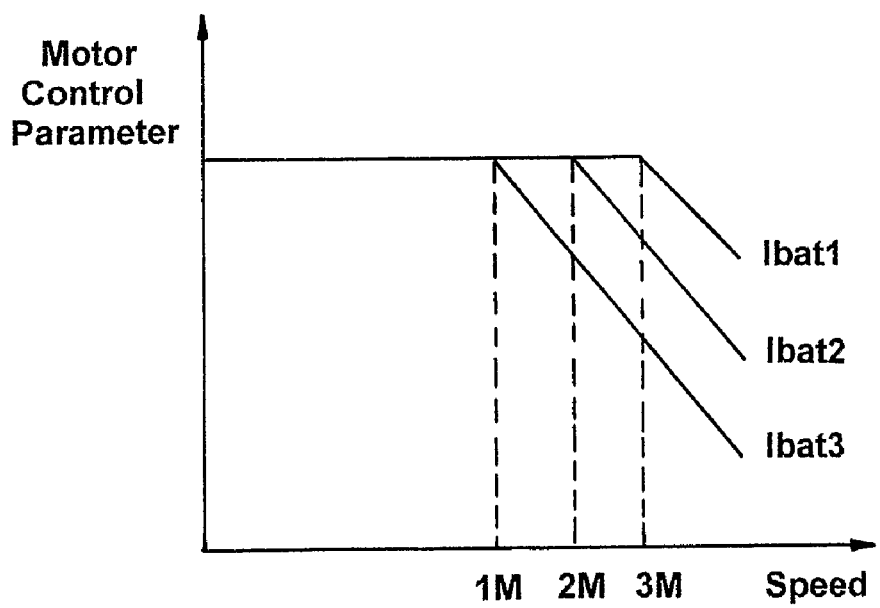
FIG. 35 shows the limiting value of control parameters at low motor speeds such that the current is relatively low.

The battery current can also be controlled by controlling other motor control parameters including the phase current limit, the q-axis current limit or the modulation index. Each of these parameters is controlled by the controller 30, and therefore the controller can be arranged to control each of these parameters to limit the battery voltage. Referring to FIG. 35, the limiting value of each of these motor control parameters can be kept constant for lower motor speeds at which the battery current will generally not be high. However, when the motor speed increases to a certain speed, any one of these parameters can be limited to a level that decreases with increasing motor speed. The higher the speed at which the maximum level of the parameter begins to be reduced, the higher the battery current that will be used. Therefore, in the examples shown, if the maximum parameter value is kept constant up to a first value IM and then decreased, the battery current can be limited to a first level $I_{bat1}$, if the maximum parameter value is kept constant up to a higher motor speed 2M, or an even higher speed 3M and then decreased, the battery current is limited to a second higher level $I_{bat2}$, or a third even higher level $I_{bat3}$.

It will be appreciated that any combination of the parameters discussed above, that is voltage boost, phase advance, phase current limit, q-axis current limit and modulation index, can be used to limit the battery current to a desired maximum value. Also this current limiting can be provided either in an open loop control, in which each of the parameters is controlled so that together they will produce a battery current that is below the desired limit, or a closed loop control in which the battery current is either directly measured or estimated, and one or more of the parameters is controlled in response to the measured battery current to limit the battery current to the desired level.

It will be appreciated that there are a number of advantages of the embodiments of the invention described above, resulting from the fact that the combined control of voltage boost and phase advance can increase the efficiency of the system at high motor speeds. For example, for a given source voltage and source current limit, the system can be controlled using the voltage boost and phase advance to produce greater efficiency and therefore greater power output at higher speeds. Also, as a result of the greater efficiency, for any particular output torque, the phase current will be lower than in many conventional systems. This also reduces the currents in the system drive circuit 8, typically referred to as an electronic control unit (ECU). This reduces the thermal stress in the system, which in turn reduces losses in the ECU, and also reduces the required component values in the ECU, thereby reducing the cost of the ECU. These benefits can be further enhanced by redesigning the motor to have a higher torque constant ($k_t$) and using voltage-boost to recover high-speed characteristics; i.e. stresses incurred under system stall conditions can be reduced without sacrificing high speed performance.

In some cases the increased efficiency can enable the motor size for a particular application to be reduced, whilst maintaining the required torque, speed and power outputs.

It will also be appreciated that, compared to a system with phase advance but no voltage boost, lower levels of phase advance and over-modulation are required within certain ranges of motor operating parameters. This reduces torque ripple, which generally increases with phase advance and over-modulation. This in turn can reduce acoustic noise generally. The reduction in phase advance or over-modulation can also be tuned such that at certain motor speeds that correspond to resonant frequencies of the mechanical system the torque ripple is low. This can further help to reduce acoustic noise.

Another advantage of reducing the phase advance angle is that it can reduce torque asymmetry between the two directions of the motor. In cost-sensitive systems errors in rotor position can occur, which result in asymmetry in the torque produced in the two directions. High levels of phase advance tend to increase this asymmetry. Therefore by reducing the phase advance for many operating conditions, the systems described can reduce this asymmetry. Also the output power of the systems described will be closer to optimum in both directions at high speeds giving tighter tolerances on the torque-speed spread.

Furthermore, achieving good motor control performance, such as dynamic operation, stability during regeneration, and robustness to parameter spread becomes increasingly difficult with high phase advance angles. The control performance can therefore be improved using the combined voltage boost and phase advance control to keep phase advance to a lower level than in known systems.

In accordance with the provisions of the patent statutes, the principle and mode of operation of this invention have been explained and illustrated in its preferred embodiment. However, it must be understood that this invention may be practiced otherwise than as specifically explained and illustrated without departing from its spirit or scope.

The invention claimed is:

1. A drive system for a motor having a rotor and at least one phase winding, the system comprising:
    a drive circuit including at least one switch associated with the winding for varying the current passing through the winding;
    a rotor position sensing device arranged to sense the position of the rotor;
    a power input for connection to a power supply at a nominal voltage;
    a boost circuit in electric communication with the power input, and controllable to boost the nominal voltage to a higher boosted voltage for application to the winding; and
    a controller arranged to provide drive signals to control the at least one switch, the controller being operable to define a current demand and a required phase advance angle of the current passing through the at least one winding relative to the magnetic field of the rotor, the controller being further operable to control the potential difference applied to the at least one winding to achieve the demanded current and the required phase advance, and to control the boosted voltage output by the boost circuit, wherein the controller is arranged to define the phase angle so that it will vary with the speed of the motor.

2. A system according to claim 1 wherein the controller is arranged to provide voltage boost for motor speeds above a predetermined boost introduction speed.

3. A system according to claim 2 wherein the controller is arranged to increase the voltage boost in a stepped manner when the motor speed reaches the boost introduction speed.

4. A system according to claim 2 wherein the controller is arranged to increase the voltage boost with increasing motor speeds over a range of motor speeds from the boost introduction speed to a higher full boost speed.

5. A system according to claim 1 wherein the controller is arranged to control the phase of the current to produce a varying phase advance of the current relative to the rotor position.

6. A system according to claim 5 wherein the controller is arranged to increase the phase advance with increasing motor speed for speeds above a phase advance introduction speed.

7. A system according to claim 6 wherein the controller is arranged to set the phase advance to zero over at least a range of zero phase advance motor speeds below the phase advance introduction speed.

8. A system according to claim 6 wherein the controller is arranged to provide a non-zero phase advance over a range of increased phase advance motor speeds below the phase advance introduction speed.

9. A system according to claim 8 wherein the controller is arranged, within the range of increased phase advance motor speeds, to provide a phase advance that increases with motor speed up to a maximum phase advance.

10. A system according to claim 9 wherein the controller is arranged within the range of increased phase advance motor speeds to provide a phase advance that decreases with motor speed from the maximum phase advance.

11. A system according to claim 8 wherein the controller is arranged to provide voltage boost for motor speeds above a predetermined boost introduction speed and further wherein the range of increased phase advance motor speeds includes a range of speeds immediately below the boost introduction speed.

12. A system according to claim 11 wherein the range of increased phase advance motor speeds includes the boost introduction speed.

13. A system according to claim 12 wherein the range of increased phase advance motor speeds includes a range of speeds immediately above the boost introduction speed.

14. A system according to claim 6 wherein the controller is arranged to provide voltage boost for motor speeds above a predetermined boost introduction speed and further wherein the phase advance introduction speed is greater than the boost introduction speed.

15. A drive system for a motor having a rotor and a phase winding, the system comprising:
    a drive circuit including at least one switch associated with the winding for varying the current passing through the winding;
    a power input for connection to a power supply at a nominal voltage;
    a boost circuit in electric communication with the power input, the boost circuit controllable to boost the nominal voltage to a higher boosted voltage for application to the winding, wherein the at least one parameter includes the level of boost provided by the boost circuit; and
    a controller arranged to provide drive signals to control the at least one switch, the controller being operable to determine a maximum current limit for the power supply and the magnitude of the current from the power supply and, the controller also being operable to control at least one control parameter of the motor thereby to limit the magnitude of the current from the power supply to the maximum current limit determined by the controller.

16. A drive system for a motor having a rotor and a phase winding, the system comprising:
    a drive circuit including at least one switch associated with the winding for varying the current passing through the winding;
    a power input for connection to a power supply at a nominal voltage; and
    a controller arranged to provide drive signals to control the at least one switch, the controller being operable to determine a maximum current limit for the power supply and the magnitude of the current from the power supply, the controller also being operable to control at least one control parameter of the motor thereby to limit the magnitude of the current from the power supply to the maximum current limit determined by the controller with the at least one parameter including phase advance with the phase advance being the angle that motor phase current is advanced relative to a back emf produced by the motor.

17. A drive system for a motor having a rotor and a phase winding, the system comprising:
    a drive circuit including at least one switch associated with the winding for varying the current passing through the winding;
    a power input for connection to a power supply at a nominal voltage; and
    a controller arranged to provide drive signals to control the at least one switch, the controller being operable to determine a maximum current limit for the power supply and the magnitude of the current from the power supply and, the controller also being operable to control at least one control parameter of the motor that includes at least one of a q-axis current limit and an over-modulation level thereby to limit the magnitude of the current from the power supply to the maximum current limit determined by the controller.

18. A drive system for a motor having a rotor and a plurality of phase winding, the system comprising:
- an input arranged to receive a battery current from a battery;
- a switching device associated with the winding for varying the current passing through each of the windings;
- a dc link arranged to provide an input current to the switching device;
- a current sensor arranged to produce a sensor output which is a measure of the current in the dc link;
- a low pass filter arranged to average the output from the current sensor to produce an averaged output, and
- a controller arranged to receive the current sensor output and the averaged output from the low pass filter to determine the battery current from the averaged output of the current sensor and to calculate the current passing through each of the windings from the sensor output.

19. A drive system according to claim 18 wherein at least one system component is provided between the input and the dc link, and the controller is arranged to determine the battery current from the output of the current sensor using a factor related to the system component.

20. A drive system according to claim 19 wherein the factor is the efficiency of the component.

21. A drive system according to claim 19 wherein the system component is a voltage booster.

22. A drive system according to claim 19 wherein the controller is arranged to determine the factor on the basis of at least one operating parameter of the system.

23. A drive system according to claim 22 wherein the parameter comprises at least one of the input voltage of the booster, the output voltage of the booster, the link current, and the temperature.

24. A drive system for a motor having a rotor and a phase winding, the system comprising:
- a drive circuit including at least one switch associated with the winding for varying the current passing through the winding;
- a rotor position sensing device arranged to sense the position of the rotor;
- a power input for connection to a power supply at a nominal voltage; and
- a boost circuit in electric communication with the power input, the boost circuit controllable to boost the nominal voltage to a higher boosted voltage for application to the winding, the boost circuit including:
- a push-pull voltage boost circuit that includes a bifilar wound component having two windings on a common magnetic core, each winding having one end connected to a common first potential;
- two active switches arranged to be switched on alternately to connect a respective one of the windings to a second potential thereby to produce a boosted voltage across the pair of windings; and
- two further switches arranged to be switched on alternately to connect a respective one of the windings to an output thereby to apply the boosted voltage to the output; and
- a controller arranged to provide drive signals to control the at least one switch; the controller also arranged to define a current demand and a required phase advance of the current passing through the winding relative to the magnetic field of the rotor and to control the potential difference applied to the winding to achieve the demanded current and the required phase advance while also controlling the boosted voltage output with the boost circuit.

25. A drive system according to claim 24 wherein the switches of the boost circuit can all be switched to an off state such that the push-pull voltage boost circuit operates in a passive mode in which current can flow through both of the windings to the output.

26. A drive system according to claim 24 wherein the further switches in the push-pull voltage boost circuit can be switched on to reduce their resistance while the active switches are switched off, so that current can flow through both of the windings to the output through further switches with reduced losses.

27. A drive system according to claim 24 wherein the active switches in the push-pull voltage boost circuit can be turned off and the further switches turned on such that regenerative current can flow from the output through the circuit.

* * * * *